US007002549B2

(12) United States Patent
McCahon et al.

(10) Patent No.: US 7,002,549 B2
(45) Date of Patent: Feb. 21, 2006

(54) OPTICALLY BASED MACHINE INPUT CONTROL DEVICE

(76) Inventors: Stephen William McCahon, 9401 E. Placita Lila, Tucson, AZ (US) 85749; Paul B. Lundquist, 8171 E. Helen St., Tucson, AZ (US) 85715

( * ) Notice: Subject to any disclaimer, the term of this patent is extended or adjusted under 35 U.S.C. 154(b) by 95 days.

(21) Appl. No.: 09/765,838

(22) Filed: Jan. 18, 2001

(65) Prior Publication Data

US 2002/0145588 A1   Oct. 10, 2002

(51) Int. Cl.
 *G09G 5/00* (2006.01)
(52) U.S. Cl. ....................................... 345/156; 345/158
(58) Field of Classification Search ................ 345/156, 345/157, 158, 161, 163, 165, 166, 173, 175; 257/448, 457, 435, 184
See application file for complete search history.

(56) References Cited

U.S. PATENT DOCUMENTS

| 4,794,384 A | 12/1988 | Jackson |
| 4,799,055 A | 1/1989 | Nestler et al. |
| 5,274,361 A | 12/1993 | Snow |
| 5,288,993 A * | 2/1994 | Bidiville et al. ............. 250/221 |
| 5,530,456 A * | 6/1996 | Kokubo ....................... 345/175 |
| 5,999,166 A | 12/1999 | Rangan |
| 6,008,887 A | 12/1999 | Klein et al. |
| 6,057,540 A * | 5/2000 | Gordon et al. .............. 250/221 |
| 6,256,016 B1 * | 7/2001 | Piot et al. .................... 345/166 |
| 6,342,721 B1 * | 1/2002 | Nolte et al. ................. 257/448 |

FOREIGN PATENT DOCUMENTS

JP   59089473   *  5/1984

* cited by examiner

*Primary Examiner*—Dennis-Doon Chow
(74) *Attorney, Agent, or Firm*—Birdwell & Janke, LLP

(57) ABSTRACT

A non-contact optically based apparatus for measuring the motion of a diffusely reflecting surface. The motion measurements and signals derived therefrom are used to provide input control signals to a computer or other electronic control systems requiring a human tactile or other control. The apparatus includes a unique optical sensor which senses both the magnitude and direction of the motion of a surface, relative to the apparatus, by measuring the motion of the pattern generated by illuminating the diffusely reflecting surface with a light source.

40 Claims, 17 Drawing Sheets

Speckle Pattern

Signal Measured ≠ 0

Signal Measured = 0

OPTICALLY BASED MACHINE INPUT CONTROL DEVICE

TECHNICAL FIELD

This invention relates generally to optical tracking and human-machine input devices. More particularly this patent discloses a non-contact, optically- based tracking device for use as an input control device in a computer system or other electronic control system requiring a human-machine tactile interface or other control.

BACKGROUND OF THE INVENTION

Currently, most apparatus used as human tactile input devices to control electronic systems, such as computers, use mechanical, electronic, optical, or some combination of these means to measure a force, velocity, or displacement that is converted to a parameter suitable for input to the system. The most common are mechanical or optically based and they typically control a cursor motion, an object selection, scrolling, or other operator input commands based upon visual feedback from a display device while the system under control is executing a function. Mouse devices, track-ball devices, joystick devices, and electrostatic position sensors are widely used. These apparatus, all capable of performing basic functions of an input device, each suffer from various deficiencies.

In the case of a mouse device under normal operation, whether mechanical or optically based tracking mechanisms are used, the device must be physically separated from other components of the electronic system and must be translated in physical contact to and across a relatively flat surface. Additionally, in the case of a computer, an operator must repeatedly reposition a hand between a keyboard and a mouse to perform alternately each device's control functions. Track-ball devices, joystick devices, and electrostatic sensors may be mounted on a keyboard or primary data entry device for an electronic system and thus do not necessarily require repetitive repositioning of an operator's hand. However, these devices are essentially two-dimensional control devices because they can only access two-dimensions simultaneously.

Furthermore, all the above-mentioned devices require physical contact between the operator and the control device, which causes mechanical wear. When these devices are mounted on a keyboard or other primary input device, they are usually required to take up a small amount of space. Because physical contact is required, operators' hand motions must also be small. If the controlled parameters on the machine must cover a large scale compared to the required resolution, control through small hand motions is very sensitive and uncomfortable.

More specifically, Nestler et al. U.S. Pat. No. 4,799,055 and Jackson U.S. Pat. No. 4,794,384 both disclose mouse devices which image light reflected from a two-dimensional surface onto a photo-detector array and analyze the output of the array to determine the direction of movement of the array. However, these devices are limited by the nature of the surface, the degrees of freedom of surface motion they can detect, and the need for mechanical interaction with the surface and the user's hand. The device in Snow U.S. Pat. No. 5,274,361 measures the dopler shift of light reflected from a surface as the device is moved across the surface, but otherwise has the same limitations as Nestler et al and Jackson. Another type of surface motion detection is disclosed in Klein et al. U.S. Pat. No. 6,008,887, wherein the interference pattern produced by vibration of an object illuminated by coherent light is translated into electrical signals by a photo-emf detector; however, Klein et al. is limited to detecting oscillation patterns representative of surface vibration characteristics of the object.

One non-contact and optically based input apparatus disclosed in Rangan, U.S. Pat. No. 5,999,166, although addressing many of the aforementioned deficiencies, requires a reflective element to be attached to the hand to redirect a light source in preferential directions in order to provide control. In general, the currently available human-machine input control devices typically possess at least one major deficiency: ergonomic inefficiency, the need for additional mechanisms to access a third dimension, the need for physical contact, inherent mechanical wear, or the need for hand attachments.

SUMMARY OF THE INVENTION

The invention that is disclosed herein is an apparatus and method for non-contact control of electronic signals using optical means. Within the invention, there is a light source that generates a pattern when its radiation is reflected from a diffusely scattering surface. The spatial variation in light irradiance of the pattern can be viewed or measured away from the light scattering surface. The apparatus is based primarily upon detecting the motion of an optical pattern whose position and movements are under the control of an operator, or other mechanism, via control of the motion and orientation of the speckle-producing surface. When the light is reflected from a scattering surface that is moving with respect to the apparatus, a moving pattern is formed upon a photo-emf-generating material and, optionally, on other conventional photo-detecting sensors. The conventional photo-detecting sensors are used to deduce either or both range and tilt angle of the scattering surface. Electrodes on or embedded into the photo-emf generating material allow measurement of the electric currents produced within the material due to the motion of the pattern thereon. Electrical signals measured from the photo-emf material are a function of the velocity, direction, contrast, and light irradiance of the moving pattern. Electrical signals generated by the photo-emf material and optional photo-detecting sensors are converted to time varying signals and data that are compatible with the control of a computer or other device. An operator can modify the signals being produced by modifying, separately or in combination, the velocity, direction, position, and orientation of the light scattering surface. Additionally, the electrical signals can be further modified by varying other properties of the pattern such as its irradiance at the surface of the photo-emf material by modifying the power output of the optical source, or by modifying the properties of the pattern producing surface.

In the preferred embodiment of the invention, the light source is a coherent light source, the diffusely scattering surface is a hand of an operator, and the pattern is a speckle pattern generated by reflection from around the palm area. This particular embodiment can be used to provide input control commands to a computer, such as the spatial position or orientation of a cursor on a visual display, by moving the hand over the stationary apparatus. Another application of this particular embodiment is to manipulate the orientation or position of objects in computer generated virtual reality space, or by robotic means, in real space.

An aspect of the present invention is the use of specially-oriented electrode patterns on the surface of the photo-emf material that are used to measure various velocity vectors of the pattern simultaneously. This includes the ability to provide a measurement of the motion of the scattering surface along three orthogonal spatial axes and the rotational motion of the surface about the three orthogonal axes.

The underlying physical mechanisms inherent within the photo-emf material allow for very high sensitivities with respect to the detection of movement of the pattern. Therefore, the photo-emf material performs the function of a very sensitive input control device that possesses all the required degrees of freedom with respect to motion detection.

The apparatus and method of the present invention has particular advantages over the prior art in that it has no moving mechanical parts, it does not require a device to be dragged across a surface, and does not require physical contact. These advantages eliminate mechanical wear and resulting degradation of performance or lifetime. A further advantage is that the apparatus can remain stationary and thus be located on or embedded within another device, e.g., the computer keyboard or front surface of a visual display device. Thus, the operator is not required to repetitively reposition the hand between the primary data input device or control point and the control device. The preferred embodiment of the device described herein allows control, with hand motions, of a much larger scale than the pointing device itself and thus is very suitable to laptop and miniaturized computers which can allocate only very limited space to the pointing device. Further, as will become evident within the detailed description of the apparatus and means of operation, this invention allows for a more ergonomically efficient and natural movement of the hand as compared to conventional human-machine input devices.

Accordingly, it is a principal object of the present invention to provide a novel and improved optically-based machine input control device.

It is another principal object of the invention to provide a machine input device that does not require physical contact for actuation.

It is a further object of the invention to provide a machine input device that requires no moving parts.

It is yet another object of the invention to provide a machine input device that may be embedded into a machine.

It is yet a further object of the invention to provide a machine input device capable of providing more than two continuous input parameters simultaneously.

It is another object of the invention to provide a machine input device that is simple in construction.

The foregoing and other objects, features, and advantages of the invention will be more readily understood upon consideration of the following detailed description of the invention taken in conjunction with the accompanying drawings.

DETAILED DESCRIPTION OF THE INVENTION

Figure 1:
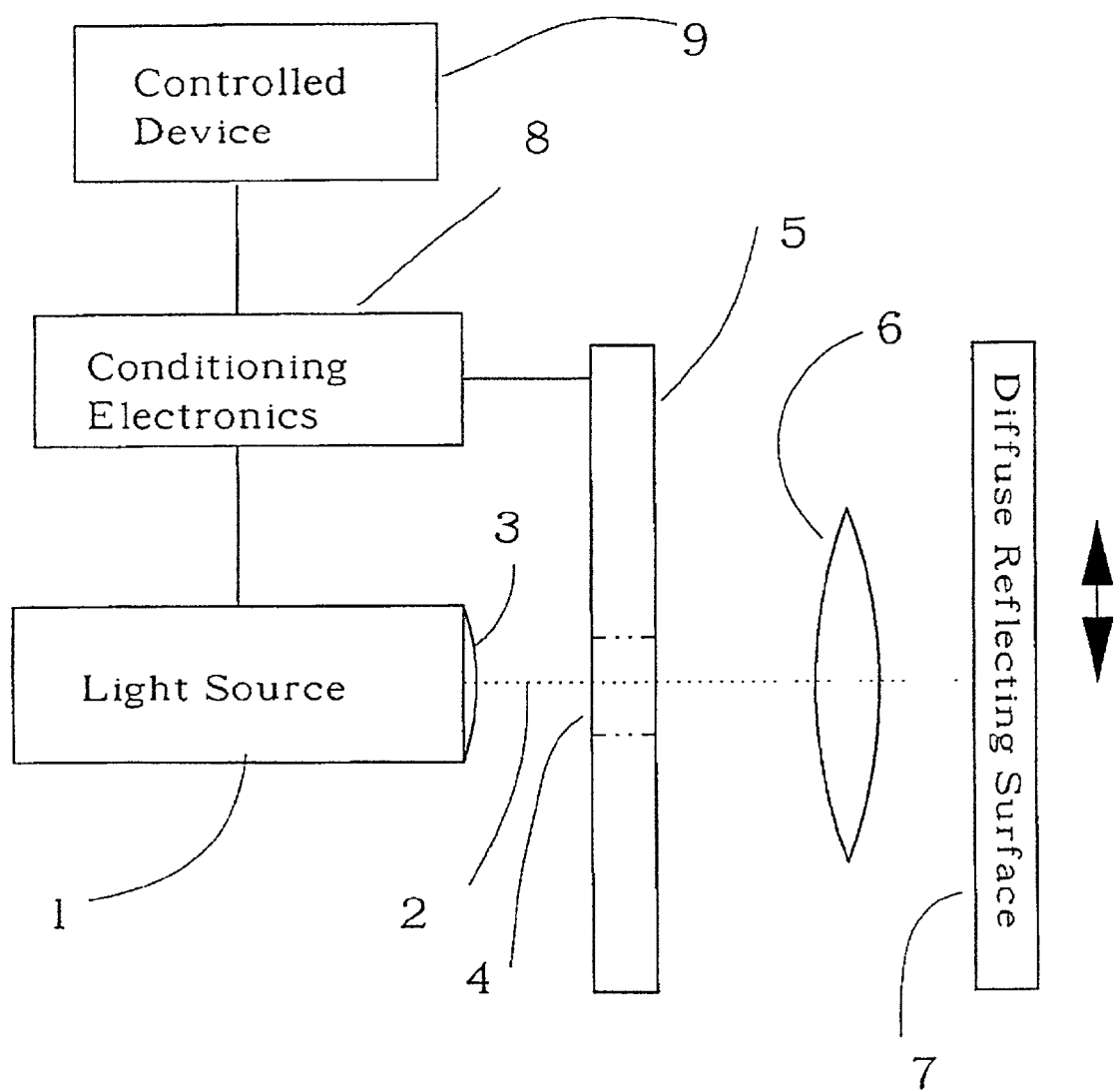
FIG. 1 shows a general schematic diagram of an optically-based machine input control device according to the invention.

Referring to FIG. 1, an apparatus suitable for an optically based human-machine interface input control device comprises a light source 1, which produces optical radiation 2 which is transmitted through an aperture 4 in the center of a pattern analyzer 5, and a directing lens system 6, resulting in an illuminated region on a diffusely reflecting surface 7. A portion of the diffusely reflected light may be redirected back toward the pattern analyzer 5 by a collecting lens system 6 to form a pattern at the surface of the pattern analyzer 5. The diffusely reflecting surface 7 may be translated along or rotated about one or more of the three orthogonal axes, causing the irradiance distribution of the pattern illuminating the surfaces of the pattern analyzer array 5 to be modified in a related manner. The pattern analyzer 5 generates electrical signals representing localized measurements of the direction, rate of motion, and irradiance distribution of an optical pattern. Electrical signals generated by the pattern analyzer 5 are sent through conditioning electronics 8 that produce electrical signals appropriate for input to a controlled device 9. Conditioning electronics circuitry may also provide feedback to the light source 1.

Preferably, the light source 1 is a coherent light source, ordinarily a laser. Coherent light reflected from a diffusely-reflecting surface will produce an interference pattern known as a speckle pattern that provides the type of contrast in intensity needed for operation of the invention. However, incoherent, or partially coherent, light sources may also be used, depending on the nature of the reflecting surface, without departing from the principles of the invention. What is important is that the pattern produced by reflection has light and dark features with sufficient contrast that the photo-emf sensor described hereafter will generate a detectable current.

Two advantages of a coherent light source are that (1) it provides a high contrast pattern, that is, a pattern with a high modulation index, and (2) the interference pattern that results from coherent light does not require imaging optics. On the other hand, an advantage of the use of incoherent light is that it does not require a relatively expensive coherent light source.

The light source 1 may be of many types. In the case of a coherent light source, low-power semi-conductor laser diodes in the milli-Watt power range are well suited for the apparatus and embodiments within this present invention. Semi-conductor laser diodes have advantages over other coherent optical sources including the following:
  (a) they generate acceptably narrow spectral bandwidths that allow for a speckle pattern with high contrast;
  (b) they are produced in a wide variety of center wavelengths, which is important for photo-emf material selection; and
  (c) they are relatively small, inexpensive, and power efficient.

A wavelength range between approximately 650 nm and 900 nm is suitable if gallium arsenide is used as the photo-emf material. This combination of wavelength range and photo-emf material allows for a very strong absorption of the light by the gallium arsenide, thereby producing photo-emf currents very near the illuminated surface that can be coupled easily to surface electrodes. Additionally, a strong absorption condition allows for a high photo-generated carrier density relative to the thermally-generated background carrier density inherent within most photoconductive materials, such as gallium arsenide, near room temperatures. The thermally-generated background carrier densities within the photo-emf material will act to reduce the magnitude of the photo-emf effect. For the case of gallium arsenide at room temperature and for photon energies well above its bandgap, the surface irradiance which produces a photo-generated carrier density equal to that of the background carrier density may be in the micro-Watt/cm$^2$ regime. Within the present invention, for a strong absorption condition, a steady state speckle pattern coupled to a photo-emf material with relatively low irradiance value distributions is capable of producing electronic signals at usable levels.

Figure 2A:
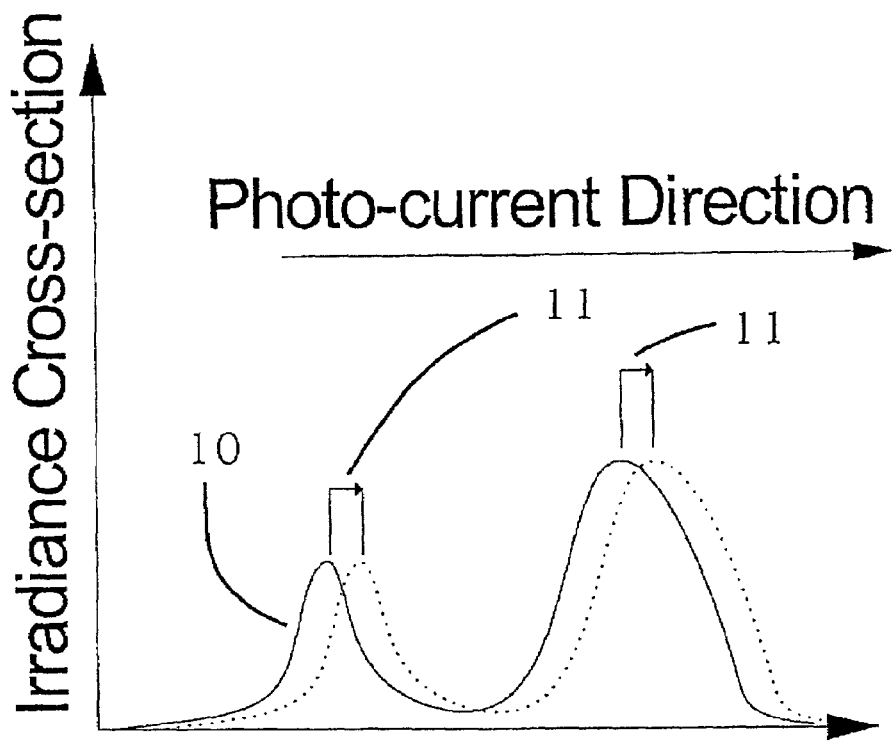
FIG. 2A illustrates a speckle pattern moving across the surface of photo-emf material.
Figure 2B:
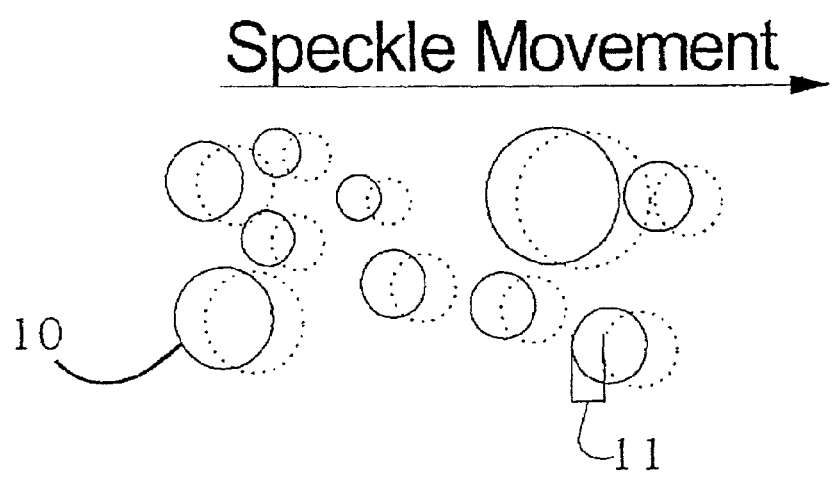
FIG. 2B shows a cross-section of light irradiance incident on the photo-emf material of FIG. 2A, a laterally shifted version of the original light irradiance distribution and resulting current flow within the material.
Figure 3A:
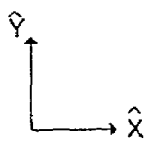
FIG. 3A illustrates a first pair of electrodes on the surface of photo-emf material and the direction of electrical current induced by a speckle pattern moving perpendicular to those electrodes.
Figure 3A:
Figure 3A:
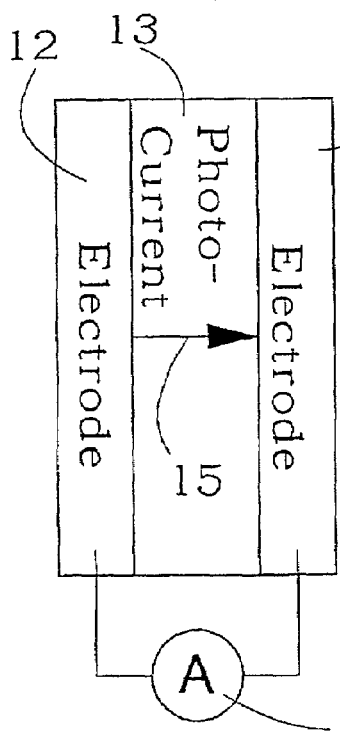
Figure 3B:
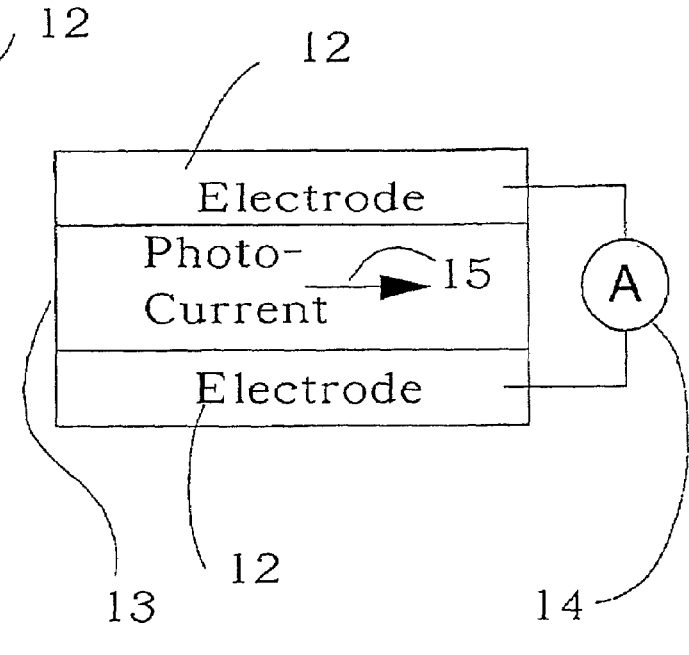
FIG. 3B illustrates a second pair of electrodes on the surface of photo-emf material and the direction of electrical current induced by a speckle pattern moving parallel to those electrodes.

The pattern analyzer requires a photo-emf capable material. The photo-emf effect is an optical phenomenon found in many types of photo-conducting materials. These photo-conducting materials have the ability to form steady state space charge electric fields whose spatial distribution is determined by the steady state irradiation pattern incident on the material and an associated spatial redistribution of photo-excited charge carriers within the material. A simple graphical demonstration of the photo-emf process is shown in FIGS. 2A and 2B. An original irradiance distribution 10 forms a spatial distribution of electric fields by photo-exciting charge carriers within high irradiance regions that diffuse to relatively low irradiance regions and become trapped. This process leaves corresponding spatially-fixed and oppositely-charged ions in the light region. Spatial redistribution of charge carriers from high- to low-irradiance regions can continue until a steady state condition is achieved that produces an excess of oppositely-signed charge in the bright and dark regions. A steady state condition is achieved by electric fields associated with the charge carriers spatial redistribution balancing against further diffusion. When the original light distribution is spatially shifted by a small amount 11, photo-excitation of carriers may occur in regions that have an existing space charge field, thereby producing a net drift of carriers and a net local electric current.

Photo-emf currents are, by definition, generated in response to a changing irradiance distribution. For a constant irradiance distribution moving with a constant velocity vector, the non-instantaneous response time of a photo-conducting material produces a spatial lag in the electric field distributions with respect to the changing intensity patterns. The spatial lag produces a steady state current proportional to the magnitude of the velocity vector and in the same direction. A stationary pattern will not produce net photo-emf currents. When the diffusely scattering surface is stationary, a condition can exist where no currents are generated in the photo-emf material and subsequently no control signals associated with the photo-emf effect are sent to the external device under control, typically a computer.

The detailed physics of the photo-emf effect, the physical properties of various photo-emf capable materials, and the use of inter-digitized electrodes to detect currents generated by the photo-emf effect are well understood in the art, as set forth in the following references:
1. S. I. Stepanov, I. A. Sokolov, G. S. Trofimov, V. I. Vlad, D. Popa, I. Apostol, "Measuring vibration amplitudes in the picometer range using moving light gratings in photoconductive GaAs:Cr," Optics Letters 15, 1239–1241 (1990).
2. I. A. Sokolov, S. I. Stepanov, G. S. Trofimov, "Detection of small vibrations of diffusely scattering objects by means of adaptive photodetectors," Sov. Phys. Acoust. 37, 519–521 (1991).
3. M. P. Petrov, I. A. Sokolov, S. I. Stepanov, G. S. Trofimov, "Non-steady-state photo-electromotive-force induced by dynamic gratings in partially compensated photoconductors," J. Appl. Phys. 68, 2216–2225 (1990).
4. N. A. Korneev, S. I. Stepanov, "Measurement of small lateral vibrations of speckle patterns using a non-steady-state photo-EMF in GaAs:Cr," Journal of Modern Optics 38, 2153–2158 (1991).

5. F. M. Davidson, C. C. Wang, C. T. Field, Sudhir Tivedi, "Photocurrents in photoconductive semiconductors generated by a moving space-charge field," Optics Letters 19, 478–480 (1994).
6. Frederic Davidson, Chen-Chia Wang, Sudhir Trivedi, "Optical phase-lock loops with photoconductive semiconductor phase detectors," Optics Letters 19, 774–776 (1994).
7. N. A. Korneev, S. I. Stepanov, "Nonsteady-State Photo-EMF in Thin Photoconductive Layers," IEEE Journal of Quantum Electronics 30, 2721–2725 (1994).
8. M. B. Klein, M. P. Chiao, G. B. Bacher, G. J. Dunning, D. M. Pepper, J. A. Coy, D. D. Nolte, "Enhanced Performance of Photo-EMF Detectors Using Asymmetric Inter-digital Contacts," OSA TOPS Vol. 27 *Advances in Photorefractive Materials, Effects, and Devices*, 643–647 (1999).
9. S. Stepenov, N. Korneev, S. Mansurova, D. Mayorga Cruz, M. Krasin'kova, M. B. Klein, "Longitudinal configuration of photo-EMF signal detection with tilted orientation of the interference fringes," in *Conference on Lasers and Electro-Optics* (CLEO), Vol. 12 of 1997 OSA Technical Digest Series (OSA, Washington D.C., 1997), p. 46.
10. D. D. Nolte, J. A. Coy, G. J. Dunning, D. M. Pepper, M. P. Chiao, G. D. Bacher, M. B. Klein, "Enhanced responsivity of non-steady-state photoinduced electromotive force sensors using asymmetric, interdigitated contacts," Optics Letters 24, 342–344 (1999).

In FIG. 3, two pattern velocity detectors are illustrated. Each pattern velocity detector consists of two electrodes 12 laid in stripes onto surfaces of a photo-emf material 13. The electrodes 12 are spaced to cover the opposing edges of the photo-emf material 13 and leave a gap in which irradiance patterns may be formed. Ammeters 14 or other current detecting devices are connected between the two electrodes 12. When the pattern moves in the $\hat{X}$ direction, photocurrent 15 in the $\hat{X}$ direction is generated for both velocity detectors. The pattern velocity detector of FIG. 3A will measure the current between the two electrodes; however, the pattern velocity detector of FIG. 3B will not measure a current because no net charge flux will cross in or out of the electrodes. The directional sense of an electrode pair is defined as the direction normal to the boundaries of the electrode pairs. Currents that are normal to the directional sense will not be measured.

Figure 4:
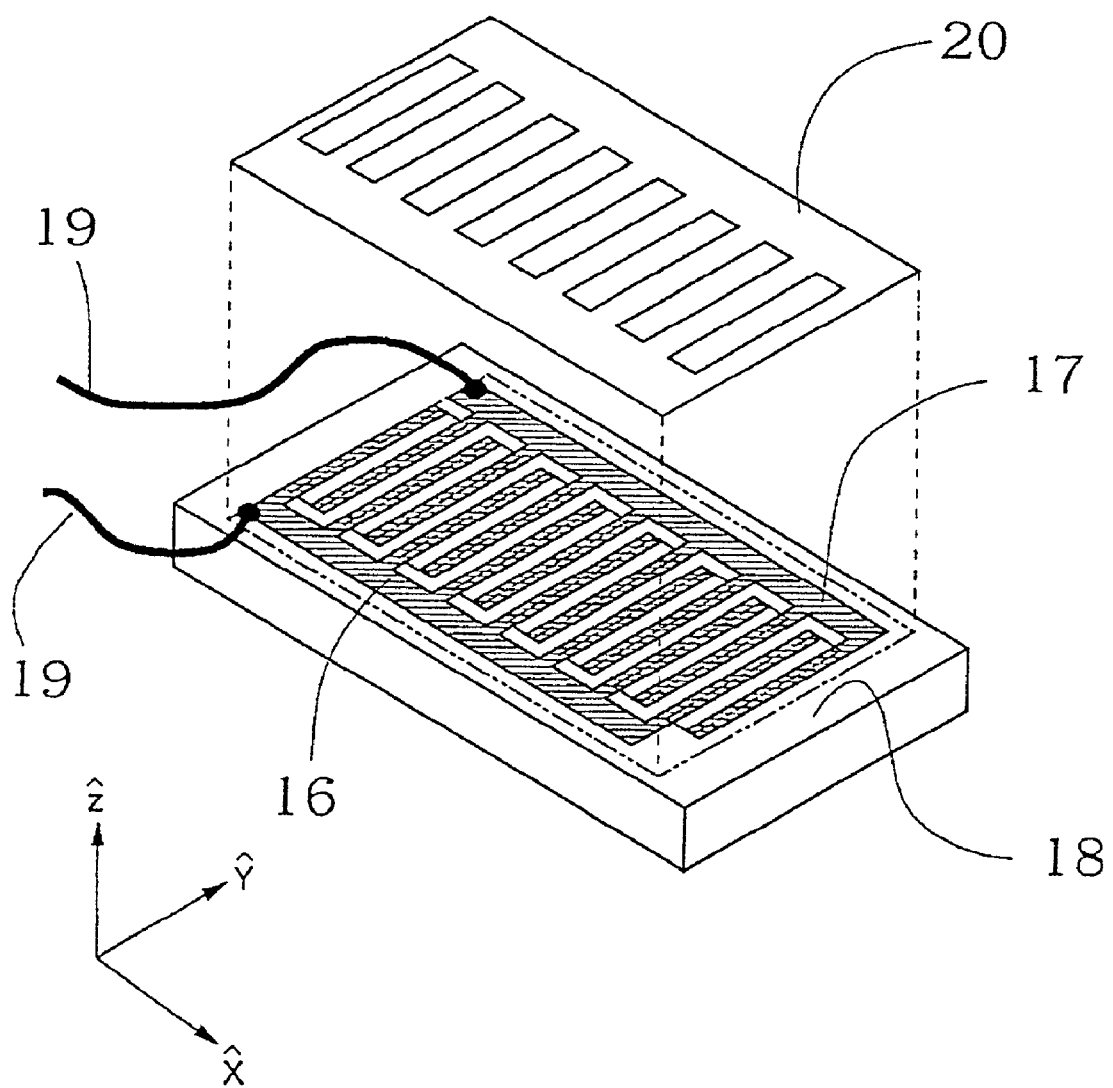
FIG. 4 shows an exploded, perspective view of an inter-digitized speckle velocity detector according to the invention.

FIG. 4 illustrates the inter-digitized electrode method for enhancing the collection of photo-emf generated currents. In this method, two disconnected electrodes 16 and 17 have sets of fingers that detect the current passing from one electrode to the other. These electrodes are laid onto a photo-emf material 18. The current may be measured through the leads 19 that are connected to the electrodes. An opaque mask pattern 20 is laid on top of the electrode pattern blocking the generation of photo-emf currents in the covered regions of a photo-emf material 18. This blocking pattern only allows current to flow in and out of the side of electrode 16 on the side facing the $\hat{X}$ direction. Likewise, currents are only allowed in and out of electrode 17 on the side facing the negative $\hat{X}$ direction. Without the blocking layer 20, the current that flows into one of the interior fingers of one of the electrodes would be reduced by the current that would flow out of the electrode finger on the opposite side. The blocking layer 20 assures that the current accumulated from each electrode pair is additively accumulated for the overall current signal. Regions where the edge of the electrodes are not perpendicular to the sensing direction for the electrode group are also blocked by the blocking layer 20 so that only velocity components that are in the sensing direction will provide signal.

In practice, the electrode pattern and mask are created on the surface of the photo-emf material using standard photolithography techniques. The photo-emf material may be gallium arsenide on which conductive electrodes are formed. The electrodes may be a Au:Ge alloy that is typically annealed at approximately 400 degrees C. for approximately 15 minutes in order to form an ohmic contact. The mask layer can be formed from any dielectric material that is opaque at the wavelength of the coherent optical source and possesses suitable mechanical properties for photolithography processing.

Alternatively, every other gap between pairs of electrodes may be made non-active by not implanting ions in those areas that would produce the photo-emf effect. In this case, the mask layer would not be necessary.

Figure 5:
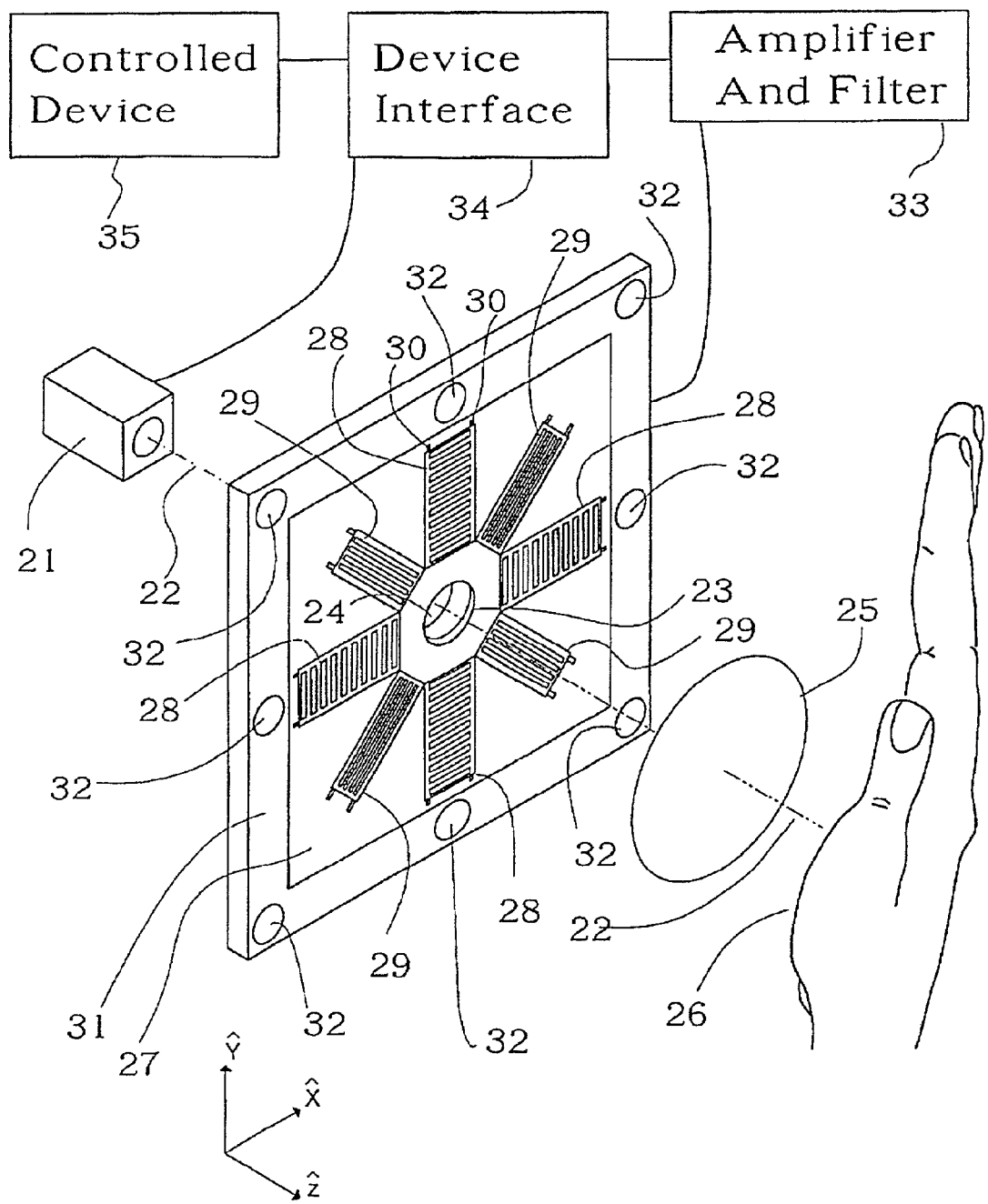
FIG. 5 shows a perspective view of a preferred embodiment of a photo-emf material and electrode pattern according to the invention, including speckle velocity detectors on the surface of the photo-emf material, light passing through the center of a speckle velocity detector array, a hand reflecting the light, and auxiliary photo-detectors.

FIG. 5 illustrates the optics and pattern velocity detector array for the preferred embodiment. A laser 21 produces a coherent optical beam 22, which passes through a hole 23 in a pattern velocity detector array 27 and through a lens 24, which is mounted within the hole 23. The beam continues through a lens 25 and scatters off a human hand 26. The lens 24 that is located within the hole 23 in the pattern velocity detector array 27 is designed to provide the optimal beam coverage on the hand 26 for the expected distances between the hand 26 and the device. The beam scatters from the hand 26 and is collected by the lens 25 forming a speckle pattern on the pattern velocity detector array 27.

The pattern velocity detector array 27 is comprised of eight inter-digitized electrode pair pattern velocity detectors 28 and 29, all constructed on the same photo-emf material. Four inter-digitized electrode pair pattern velocity detectors 28 are arranged so that they are sensitive in radial directions. The four remaining electrode pair pattern velocity detectors 29 are arranged so that they are sensitive in rotational directions. These four rotationally oriented electrode pair pattern velocity detectors 29 are placed between the radial electrode pairs 28. Each electrode pair pattern velocity detector has connectors 30 to allow the measurement of current. A board 31 holding the pattern velocity detector array 27 supports a number of photo-detectors 32. Eight are illustrated in FIG. 5.

Signals from each electrode pair and from each photo-detector are passed to the amplifier and filter circuitry 33. Amplified and filtered signals are taken as inputs to a device interface 34, which provides signals suitable for input to a controlled device 35.

The controlled device includes software in which the velocities from each pattern velocity detector and the amplitudes from each photo-detector are used to compute translations, rotations, tilts, and contractions/dilations of the speckle pattern. These temporal qualities of the pattern are used to estimate positions and orientations of the hand 26 (or other diffusely scattering surface). Estimated hand motions are used to control machine inputs.

Figure 6A:
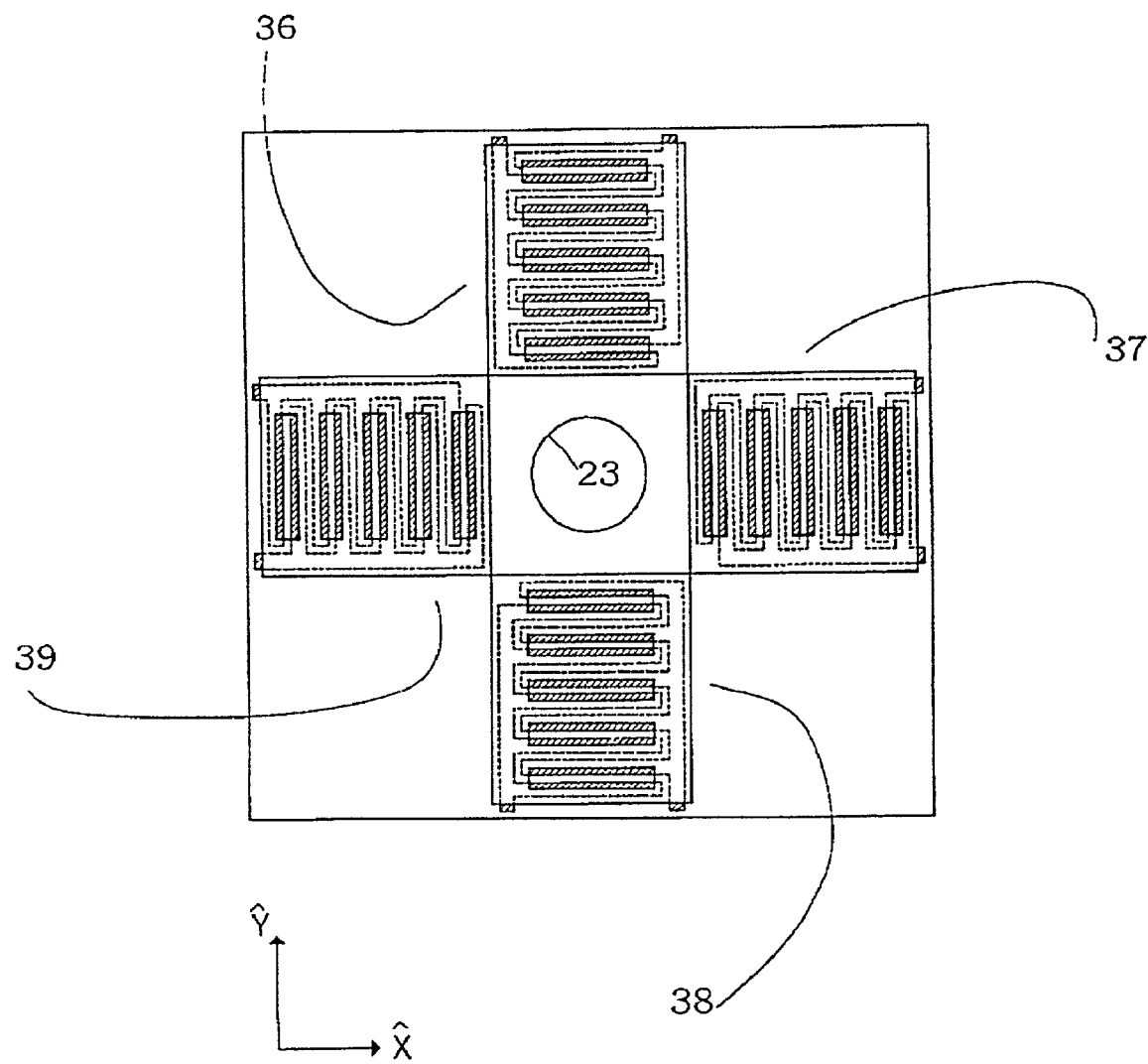
FIG. 6A shows an alternative electrode pattern according to the invention for detecting translations and dilation/contractions of a speckle pattern.

In FIG. 6A, an alternative pattern velocity detector array is presented. This pattern velocity detector array includes four pattern velocity detectors, each sensitive in respective radial directions: velocity detector 36 is directed in the $\hat{Y}$ direction; velocity detector 37 is directed in the $\hat{X}$ direction; velocity detector 38 is directed in the negative $\hat{Y}$ direction; velocity detector 39 is directed in the negative $\hat{X}$ direction. This pattern velocity detector array has the benefit of allowing measurements of translations of a speckle pattern and also measurements of contractions/dilations of a speckle pattern. Vertical speckle velocity detectors 36 and 38 give the $\hat{Y}$ component of a pattern velocity and horizontal velocity detectors 37 and 39 give the $\hat{X}$ component of a pattern velocity. Since all the detectors are oriented with radial sensitivities, the sum of the radial velocities of the pattern can be used to estimate the dilation/contraction rate of a pattern.

Figure 6B:
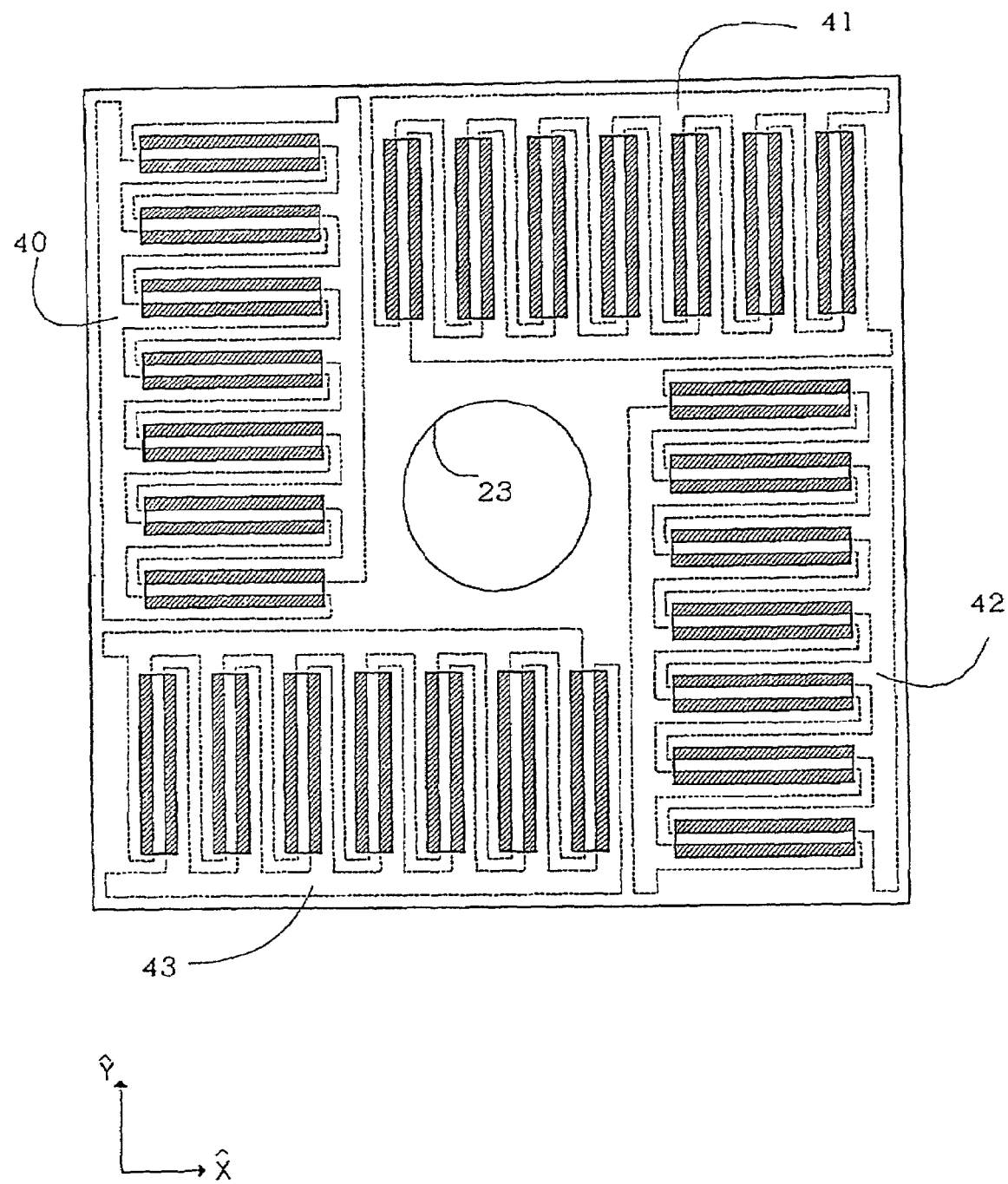
FIG. 6B shows a first alternative electrode pattern according to the invention for detecting translations and rotations.

A second alternative pattern velocity detector array is illustrated in FIG. 6B. In this illustration there are also four pattern velocity detectors. Pattern velocity detectors 40 and 42 are oriented in the vertical direction. Pattern velocity detectors 41 and 43 are oriented in the horizontal direction. The vertical and horizontal pattern velocity detectors are used to measure velocity components in the $\hat{Y}$ and $\hat{X}$ directions respectively. Each of the detectors will also measure velocities due to rotations as well. This pattern velocity detector array is appropriate for circumstances where the diffusely reflecting surface would be expected to maintain a constant distance from the device so that the pattern is not expected to undergo any dilation or contraction. Individual pattern velocity detectors cover the majority of the photo-emf material. For this reason, the blocking layer is continuous over the surface of the pattern velocity detector.

Figure 6C:
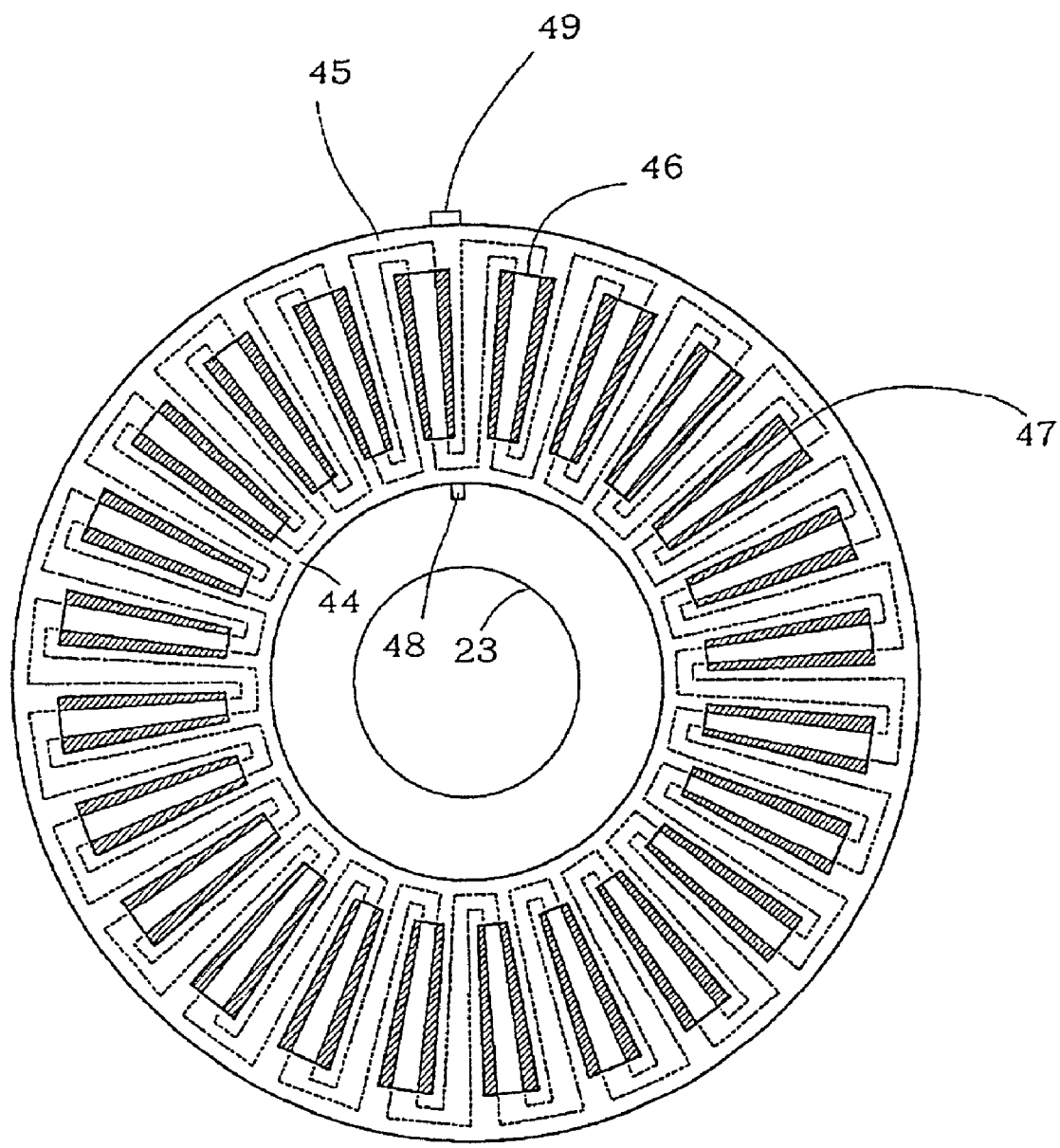
FIG. 6C shows a second alternative electrode pattern according to the invention for detecting rotations.

FIG. 6C is an illustration of a pattern velocity detector array that consists of a single pattern velocity detector. The pattern velocity detector includes an inter-digitized electrode pair directed in a continuous circle about the center of the detector. An inner electrode 44 has fingers emanating outward from an inner circular connecting-portion of the electrode. An outer electrode 45 has fingers that stem inward from an outer circular connecting-portion of the electrode. A blocking layer 46 has gaps that allow an irradiance pattern to reach a photo-emf material 47 between the clockwise side of the inner electrode 44 and the counter-clockwise side of the outer electrode 45. Connector 48 on the inner electrode and connector 49 on the outer electrode are used to extract the current signal from the pattern velocity detector array. This pattern velocity detector array can be used for measuring rotations of the pattern and efficiently covers the photo-emf material. This pattern velocity detector array is insensitive to contraction/dilations of the pattern (about the center of the pattern velocity detector array).

Figure 6D:
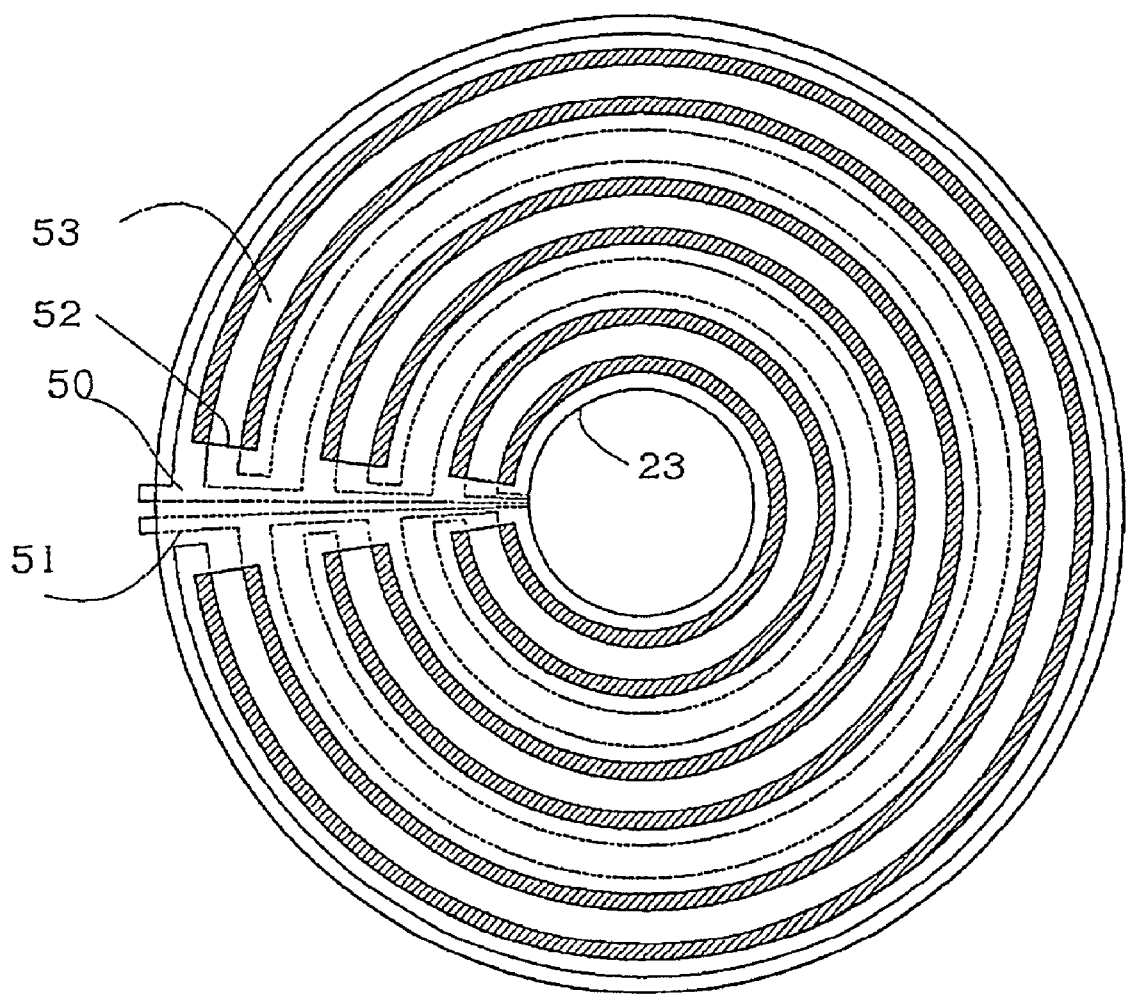
FIG. 6D shows a third alternative electrode pattern according to the invention for detecting dilation/contractions.

A pattern velocity detector array that measures primarily dilation/contraction of the pattern is illustrated in FIG. 6D. This pattern velocity detector array also includes only a single pattern velocity detector. The pattern velocity detector includes an inter-digitized electrode pair where the fingers of an outer electrode 50 stem clockwise along arcs about the center of the pattern velocity detector array. Likewise, an inner electrode 51 has fingers that stem counter-clockwise along arcs about the center of the pattern velocity detector array. A blocking layer 52 has arc-shaped gaps to allow radiation to reach a photo-emf material 53 between the inner side of the outer electrode 50 and the outer side of the inner electrode 51. This pattern has the advantage that it is insensitive to rotations about the center of the pattern velocity detector array. It also makes efficient use of the photo-emf material.

Figure 6E:
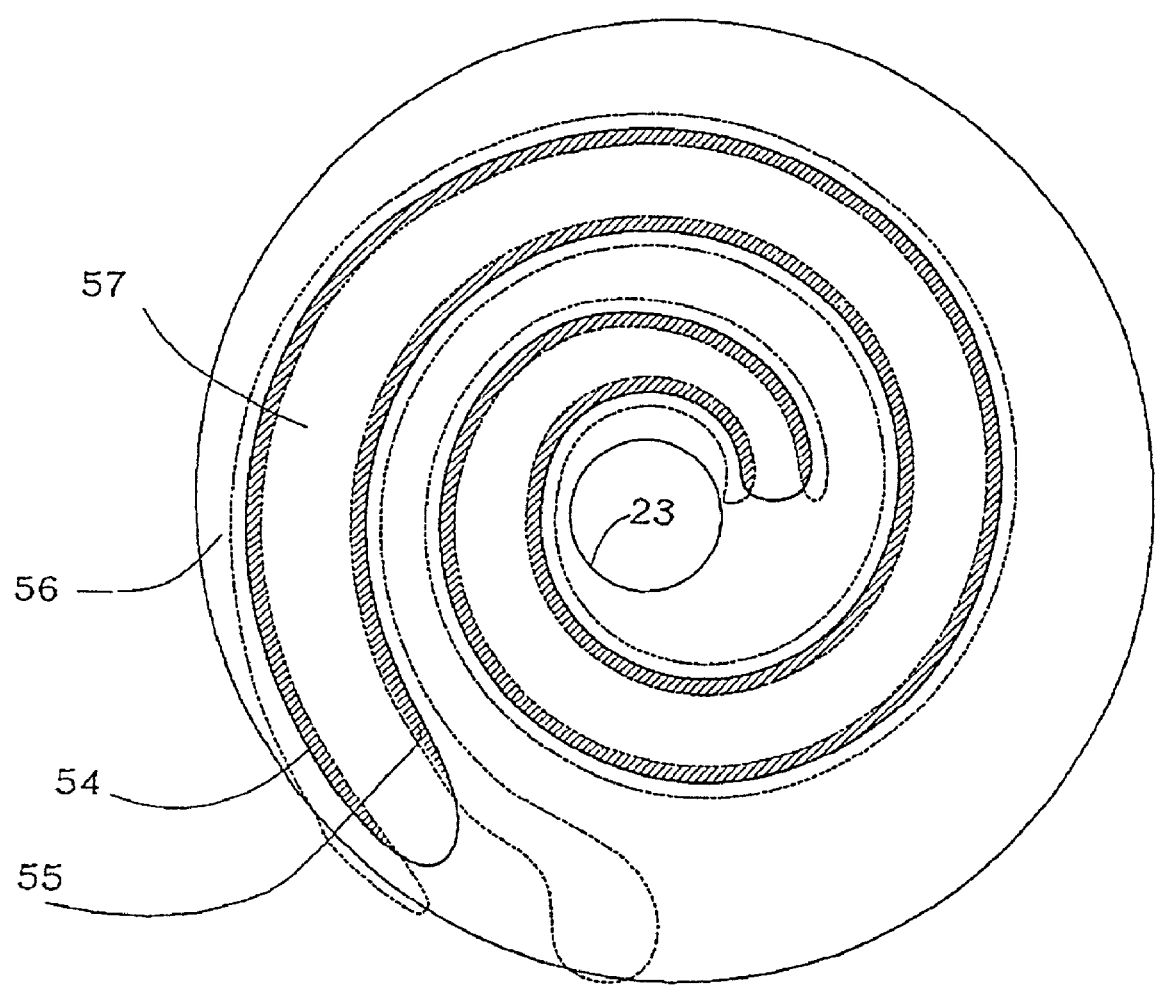
FIG. 6E shows a fourth alternative electrode pattern according to the invention for detecting dilation/contractions.

A second pattern velocity detector array for measuring primarily dilation/contraction of the speckle pattern is illustrated in FIG. 6E. The single pattern velocity detector in this pattern velocity detector array includes a spiraling electrode pair 54 and 55. A blocking layer 56 has gaps to allow irradiance patterns to be formed on a photo-emf material 57 between the inner side of an outer spiral electrode 54 and the outer side of an inner spiral electrode 55. This pattern velocity detector array has the same advantages as the pattern velocity detector array illustrated in FIG. 6D. This pattern velocity detector array could pick up small components of velocities that are not in the radial direction.

Figure 6F:
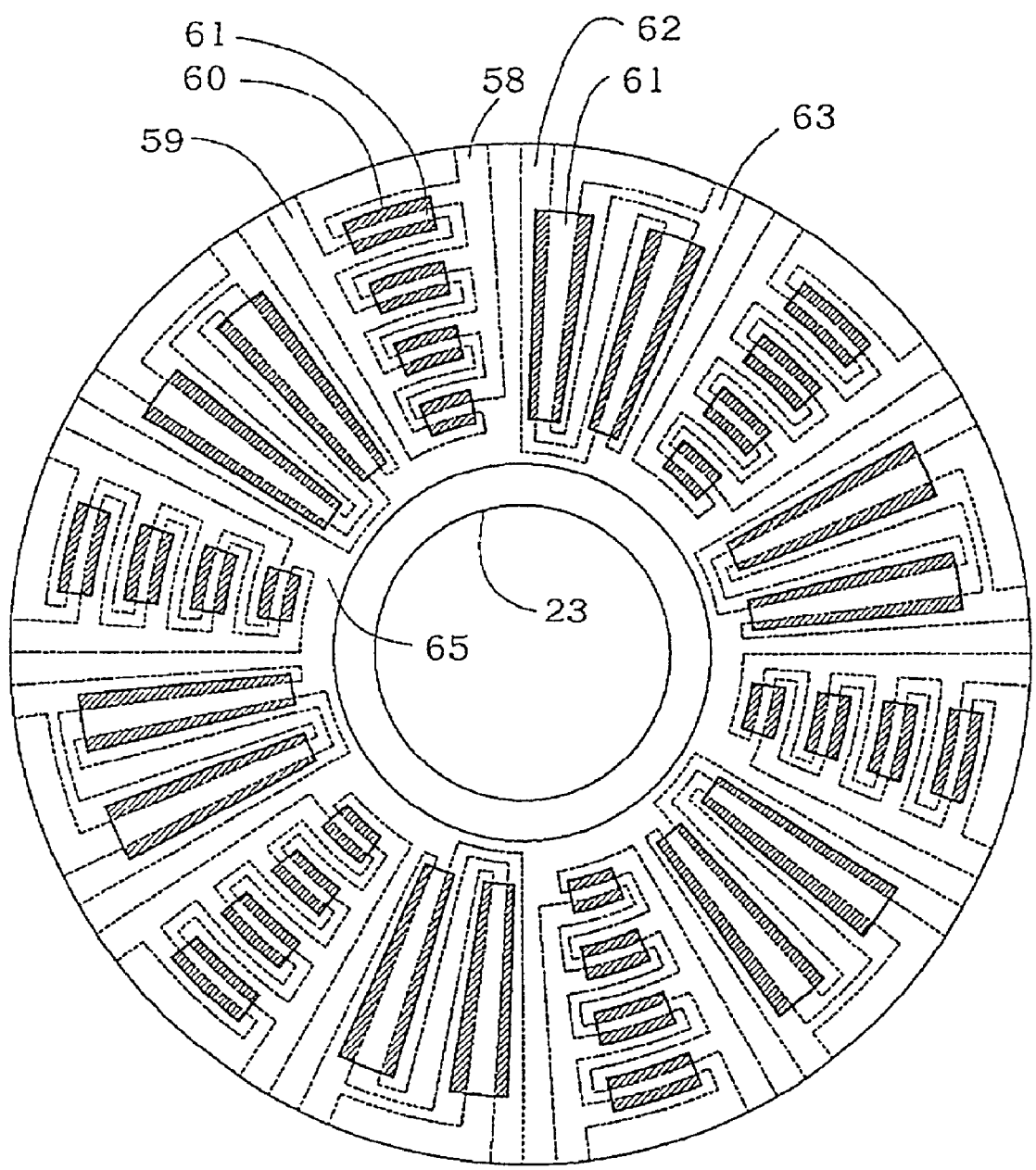
FIG. 6F shows a fifth alternative electrode pattern according to the invention for detecting dilation/contractions, translations and rotations.

FIG. 6F illustrates a variation on the pattern velocity detector array presented as part of the preferred embodiment. This pattern velocity detector array includes an equal number of radial and rotational inter-digitized pattern velocity detectors. (There are 6 each in FIG. 6F.) A blocking layer 65 includes gaps that allow radiation to reach a photo-emf material 61 between the inner sides of outer electrodes 58 and the outer sides of inner electrodes 59 of the radially directed inter-digitized electrode pairs. Gaps in a blocking layer 65 also allow for radiation to reach the photo-emf material 61 between the clockwise sides of inner electrodes 62 and the counter-clockwise sides of outer electrodes 63 of the rotationally directed inter-digitized electrode pairs. This pattern velocity detector array may be used to measure rotational pattern velocities and pattern dilation/contractions. It also may be used to compute pattern translations. The reader may notice that there are more detectors than necessary to determine each of the main pattern motions. This redundancy can be used to reduce signal noise through averaging, or it may be used to provide some spatial resolution on the pattern velocity. This pattern velocity detector array has an advantage over the preferred embodiment in that it more efficiently uses the photo-emf material. Its disadvantage is that it is more complicated.

Figure 7:
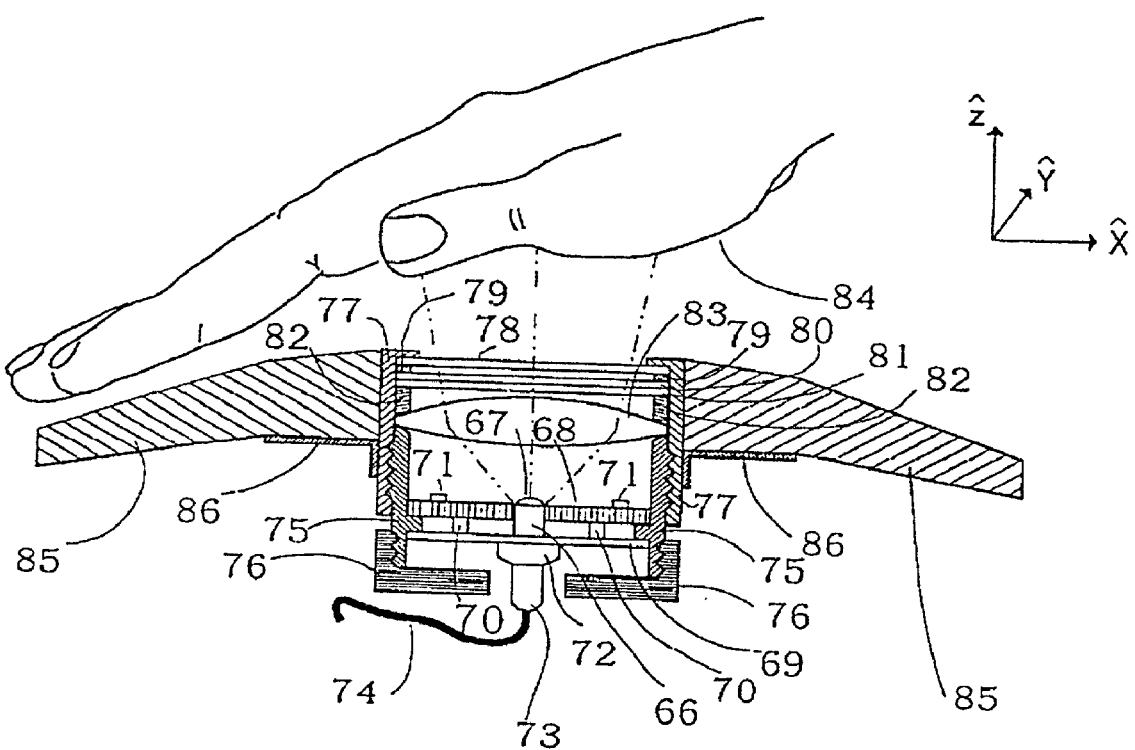
FIG. 7 shows a side, partial section view of the preferred embodiment of the invention, including the primary elements of a human-machine input control device.

A diagram illustrating an assembly of a preferred embodiment of the invention is presented in FIG. 7. A laser 66 and lens 67 assembly is inserted through a detector board 68 and is mounted on an electronics board 69. Electrical connectors 70 transmit detector signals from the detector board 68 to the electronics board 69. Conventional photo-detectors 71 line the perimeter of the detector board. Amplified and filtered signals from the electronics board 69 are transmitted through an output socket 72. A cable plug 73 is inserted into the output socket 72. A cable 74 transmits device output signals from the cable plug 73 to a controlled device. The detector board 68 and the electronics board 69 are mounted on the top and bottom of a cylindrical ridge on the inside of a sensor assembly tube 75. Threads on the bottom of the sensor assembly tube 75 allow a threaded sensor-assembly cover 76 to be screwed onto the back. The cable plug 73 passes through a hole in the sensor assembly cover 76.

The top of the sensor assembly tube 75 is threaded so that a threaded cylindrical optics holding lip 77 can be screwed onto the top. Several optical elements may be held in place by suitable cylindrical spacers set between the optics holding lip 77 and the top of the sensor assembly tube 75. A transparent protective window 78 is abutted, from underneath, to the top of the optics holding lip 77. Below the transparent window 78, there is a cylindrical spacer 79 that rests on top a set of flat optical elements. The flat optical elements may include a spectral filter 80 designed to allow only a small optical bandwidth about the laser frequency and an optional polarizing plate 81. Below the flat optics 80 and 81 there is a cylindrical spacer 82 that separates the flat optical elements from a lens 83 designed to collect the light scattered from a human hand 84 on to a detector board 68. The lens 83 is held between the cylindrical spacer 82 and the top of the sensor assembly tube 75. The optics holding lip 77 is attached to the case of an external device 85 by a cylindrical bracket mount 86. The external device may be, for example, the keyboard assembly of a lap top computer or a miniaturized computer.

Figure 8:
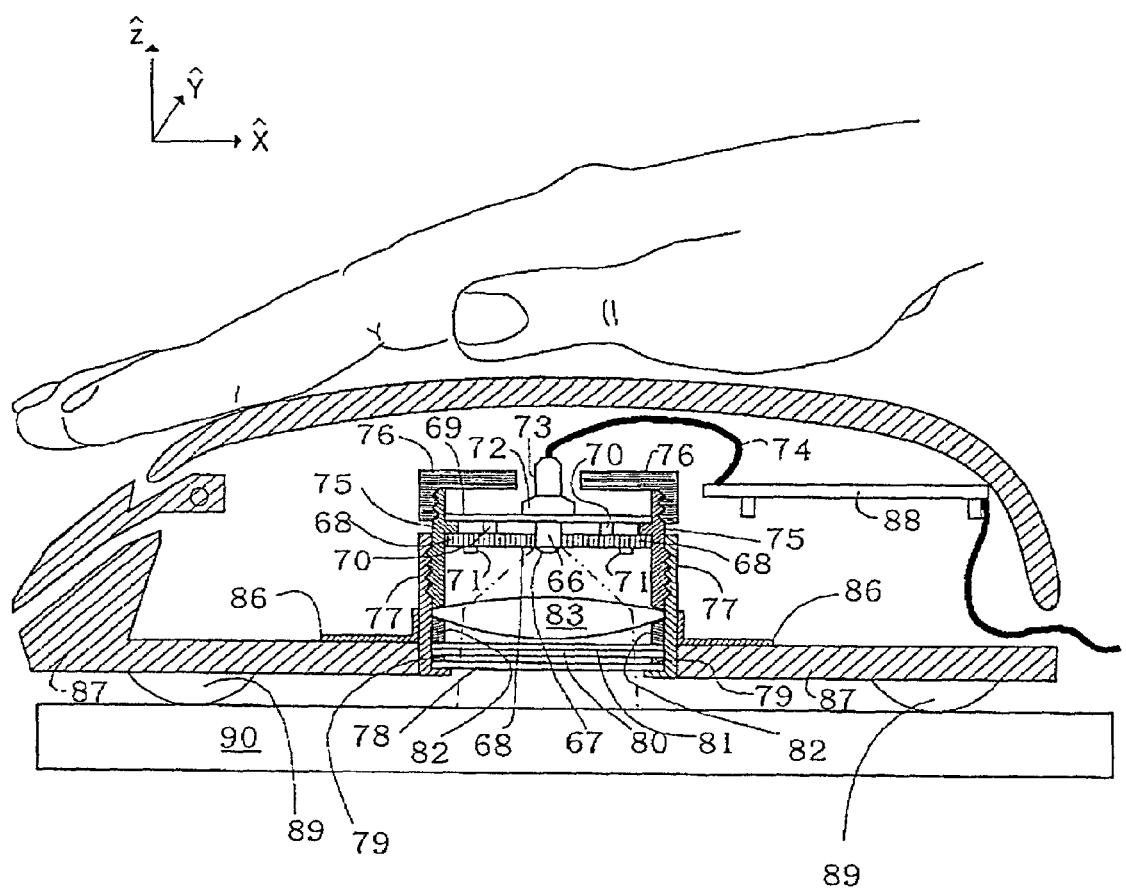
FIG. 8 shows a side, partial section view of a first alternative embodiment of the invention wherein non-contact optical sensing is used to detect relative motion between a mouse device and a diffusely reflecting surface beneath it.

An alternative embodiment of the invention is illustrated in FIG. 8, where the device of FIG. 7 is essentially turned upside-down and used to detect motion of an optical-mouse. For this application, measurement of range is not necessary and the pattern velocity detector array illustrated in FIG. 6B is appropriate. Also, because tilt of the diffusely reflecting surface does not need to be measured in this embodiment, the conventional photo-detectors may be omitted. The photo-detectors could also be included and used for feedback on the laser power control.

The laser 66 and lens 67 assembly is inserted through the detector board 68 and is mounted on the electronics board 69. Electrical connectors 70 transmit detector signals from the detector board 68 to the electronics board 69. Amplified and filtered signals from the electronics board 69 are transmitted through an output socket 72. The cable plug 73 is inserted into the output socket 72. The cable 74 transmits device output signals from the cable plug 73 to the an optical mouse circuit board 88 which integrates the optical signal with signals from other control buttons or switches on the device. The detector board 68 and the electronics board 69 are mounted on the top and bottom of a cylindrical ridge on the inside of the sensor assembly tube 75. Threads on the back of the sensor assembly tube 75 allow the threaded sensor-assembly cover 76 to be screwed onto the back. The cable plug 73 passes through a hole in the sensor assembly cover 76.

The front of the sensor assembly tube 75 is threaded so that a threaded cylindrical optics holding lip 77 can be screwed onto the top. Several optical elements may be held in place by suitable cylindrical spacers set between the optics holding lip 77 and the top of the sensor assembly tube 75. A transparent protective window 78 is abutted, from underneath, to the top of the optics holding lip 77. Just within the transparent window 78, there is a cylindrical spacer 79 that abuts the flat optical elements. The flat optical elements include a spectral filter 80 designed to allow only a small bandwidth about the laser frequency and an optional polarizing plate 81. Abutted to the flat optics 80 and 81 there is cylindrical spacer 82 that separates the flat optical elements from a lens 83 designed to collect the light scattered from a diffusely reflecting surface 90 onto the detector board 68.

The lens 83 is held between the cylindrical spacer 82 and the top of the sensor assembly tube 75. The optics holding lip 77 is attached to the bottom of the case of an optical mouse device 87 by a cylindrical bracket mount 86. The optical mouse has skids 89 attached to the bottom to maintain an approximately constant distance between the transparent protective window 78 and the diffusely reflecting surface 90 below. One of the advantages of this optical mouse device compared to others currently available is that signals due to rotations of the mouse about the $\hat{Z}$ axis can be used for graphical inputs.

Figure 9:
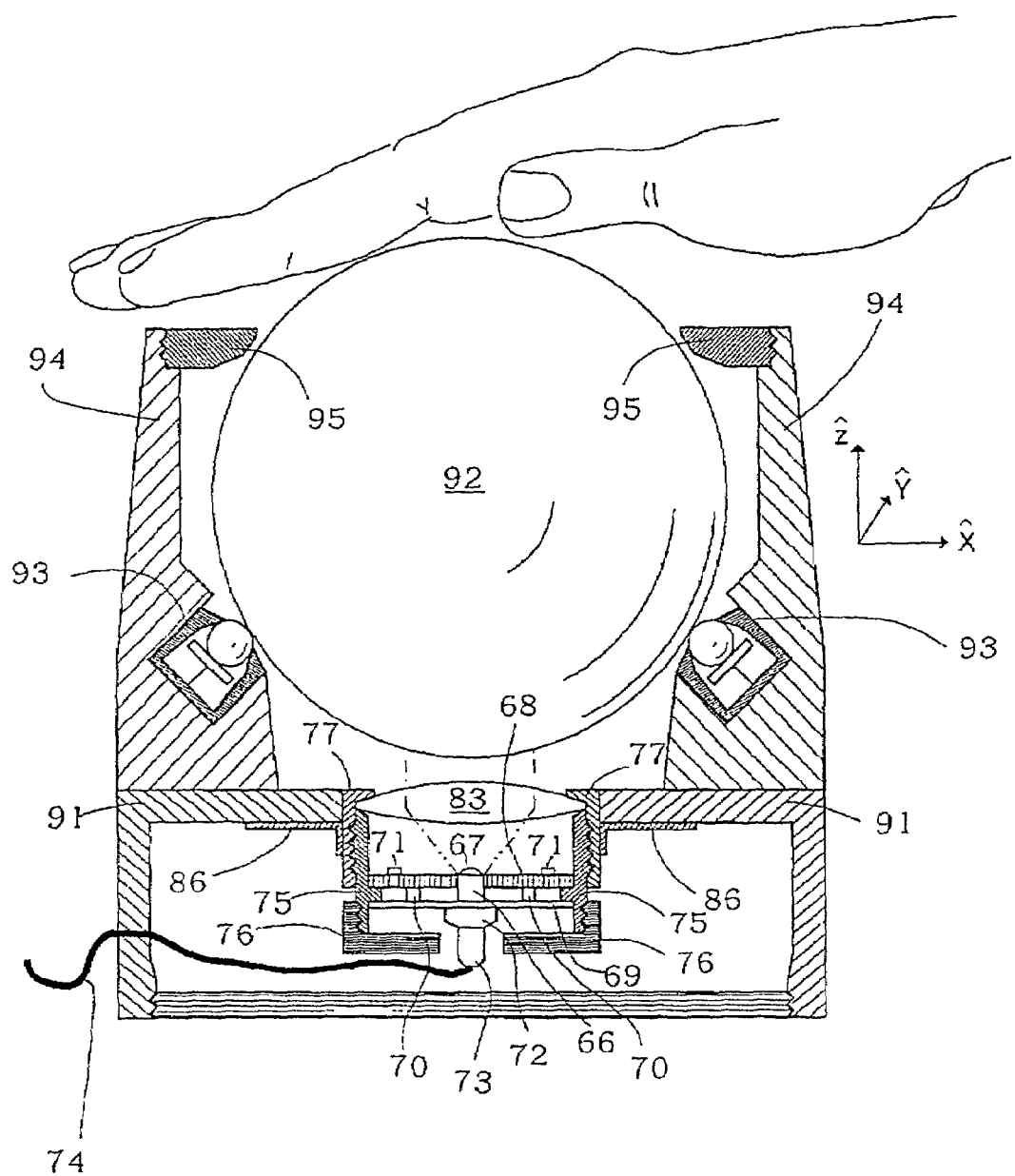
FIG. 9 shows a side, partial section of a second alternative embodiment of the invention wherein non-contact optical sensing is used to detect the rotation direction of a track-ball.

An additional embodiment of this invention uses the sensor assembly within a trackball device. This embodiment is illustrated in FIG. 9, where the device of FIG. 7, with a few modifications, is essentially mounted underneath a trackball 92. The trackball is held above the sensor assembly by three or more rotary bearing assemblies 93, which may or may not be spring-loaded. The rotary bearing assemblies are attached to the inside of a cylindrical trackball holding ring 94. The trackball holding ring is threaded inside the top so that a holding lip 95 may be screwed into place to keep the trackball 92 from slipping out of the device.

The laser 66 and lens 67 assembly is inserted through the detector board 68 and is mounted on the electronics board 69. Electrical connectors 70 transmit detector signals from the detector board 68 to the electronics board 69. Amplified and filtered signals from the electronics board 69 are transmitted through an output socket 72. The cable plug 73 is inserted into the output socket 72. The cable 74 transmits device output signals from the cable plug 73 to an external device. The detector board 68 and the electronics board 69 are mounted on the top and bottom of a cylindrical ridge on the inside of the sensor assembly tube 75. Threads on the back of the sensor assembly tube 75 allow the threaded sensor-assembly cover 76 to be screwed onto the back. The cable plug 73 passes through a hole in the sensor assembly cover 76.

The front of the sensor assembly tube 75 is threaded so that a threaded cylindrical optics holding lip 77 can be screwed onto the top. In this embodiment neither a spectral filter nor a polarization plate may be necessary. The lens 83 is held between the optics holding lip 77 and the top of the sensor assembly tube 75. The optics holding lip 77 is attached to the supporting structure of a trackball assembly 91 by a cylindrical bracket mount 86.

Any of the pattern velocity detectors illustrated in FIG. 6A, FIG. 6B, or FIG. 6F may be appropriate for use in the embodiment of FIG. 9, as well as the pattern velocity detector array that is part of the preferred embodiment. The pattern velocity detector array illustrated in FIG. 6A provides translational control available in most trackballs. The other recommended pattern detectors also allow rotation of the trackball 92 about the $\hat{Z}$-axis to provide another dimension of control. Through either the photo-detectors or the pattern dilation/contraction sensitivity available in the pattern velocity detector arrays illustrated in FIG. 6F or in the preferred embodiment, the distance between the collecting lens and the trackball is sensed. The distance between the trackball and collecting lens can be allowed to vary by spring mounting the ball bearing assemblies.

Conventional photo-detectors may be positioned on the surface of the photo-emf device or allowed to sample a fraction of the irradiance distributions by means of an optical beam splitter. The basic photo-emf device does not directly measure static or uniform irradiance distributions. The photo-detectors would provide direct measurements of static or uniform irradiance distributions incident upon the photo-emf device which can then be used in conjunction with the photo-emf signals to control certain device operations. For example, pitch and tilt movements of the palm area of a hand cannot continue indefinitely in any one direction. It may be desired, however, by the operator to maintain continuance of the pitch or tilt motion command within the device under control. For the condition of pitch or tilt of the scattering surface, a skewing of the scattered irradiance pattern occurs. When the scattering surface is moved in such a manner to produce an associated skewed irradiance distribution, differential signals from the photo-detectors would surpass a predetermined threshold value and be recognized as a command to provide continuance of the motion commands present at that time. The motion continuation process would remain until the differential irradiance values at the photo-detectors falls below the continuance command threshold due a reorientation of the scattering surface. Thus, the combination of signals from the photo-detectors and photo-emf device can allow for activation/de-activation of a continuance in time of the basic control signals present at the time of activation.

It is to be recognized that other photo-detection devices may also be used in conjunction with the sensitive photo-emf device to create a usable control device notwithstanding the physical limitations of the scattering surface.

SIMULATIONS

First, to more fully illustrate the invention, the temporal evolution of speckle patterns resulting from optical scatter from a moving surface have been simulated. In these simulations a square portion of the surface is illuminated and undergoes a random spatial phase shift. The resulting irradiance at the detector plane is then calculated.

Figure 10A:
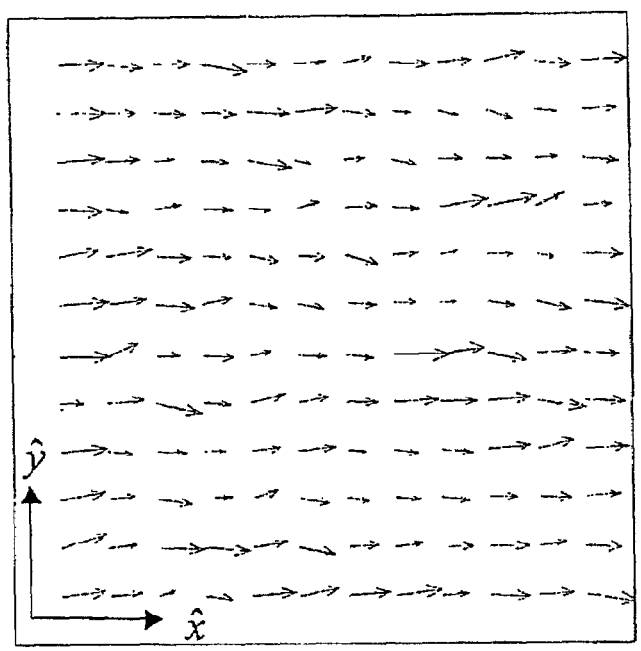
FIG. 10A shows an intensity-weighted velocity vector field of a speckle pattern produced by a numerical simulation of a translation of a diffusely reflecting surface in a transverse motion.

Variations in the speckle patterns were observed after shifting the location and orientation of the spatially dependent phase shift. By sequentially updating the phase shift and recording the resulting speckle pattern for many shifts, the time evolution of the speckle pattern was constructed for four primary types of motion. Time-averaged intensity weighted velocity flows were estimated for each sequence of phase shifts. The flows ($\Phi(x, y)$) were estimated using the following expression:

$$\Phi = \frac{1}{2(L-1)} \sum_{m=1}^{L-1} \left\{ (I_m + I_{m-1}) \frac{I_m - I_{m-1}}{|\nabla(I_m + I_{m-1})|^2} \nabla(I_m + I_{m-1}) \right\},$$

where L is the number of phase shifts in the sequence, $I_j$ is the two-dimensional spatial speckle intensity distribution on the $j^{th}$ phase shift. Contributions due to vanishing gradients were eliminated from the sum. FIG. 10A shows a flow vector field from translating the scattering randomized phases in the $\hat{x}$ direction. The flow vector field is seen to be in the same direction as the motion in the scattering surface.

Figure 10B:
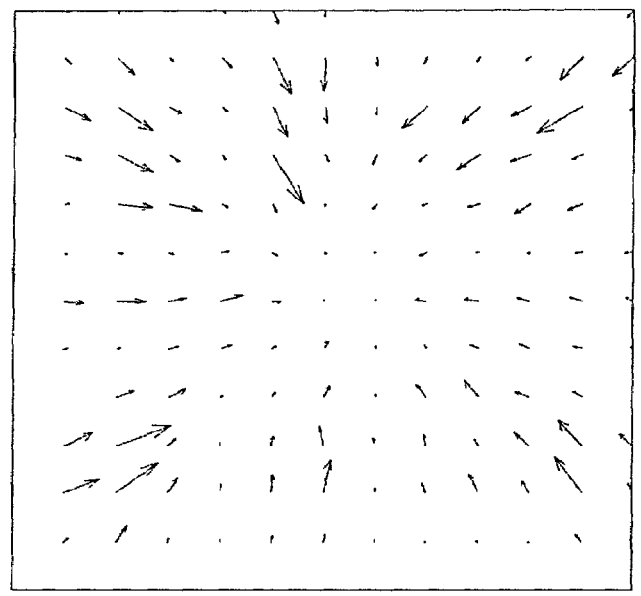
FIG. 10B shows an intensity-weighted velocity vector field of a speckle pattern produced by a numerical simulation of a translation of a diffusely reflecting surface in a direction normal to the speckle velocity detector array.

In a second type of motion simulated, the distance between the scattering surface and the detector were decreased on each subsequent frame, leading to a contraction of the speckle pattern. The resulting vector flow field in the speckle pattern is illustrated in FIG. 10B and demonstrates that variations in the distance between the scattering surface and the detector result in radial vector flow fields.

Figure 10C:
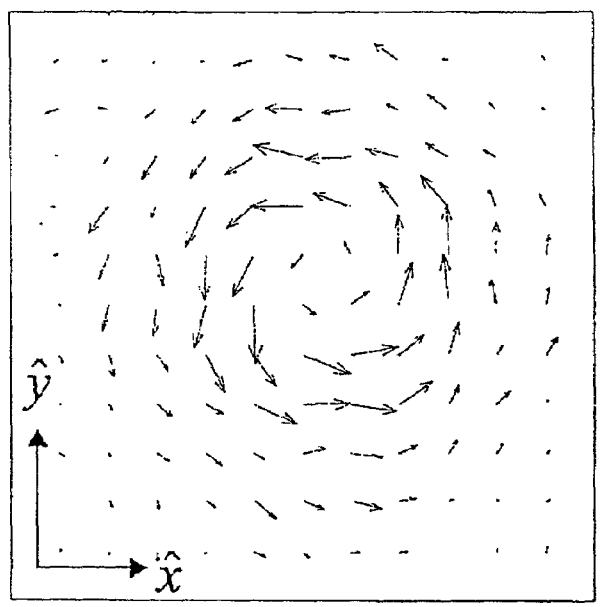
FIG. 10C shows an intensity-weighted velocity vector field of a speckle pattern produced by a numerical simulation of a rotation of a diffusely reflecting surface about a direction normal to the speckle velocity detector array.

A third type of motion simulated was a rotation of the scattering surface about an axis normal to the detector. The flow field resulting from this type of rotation is illustrated in FIG. 10C, where the rotation of the scattered speckle distribution clearly is seen to result in a rotational vector flow field.

Figure 10D:
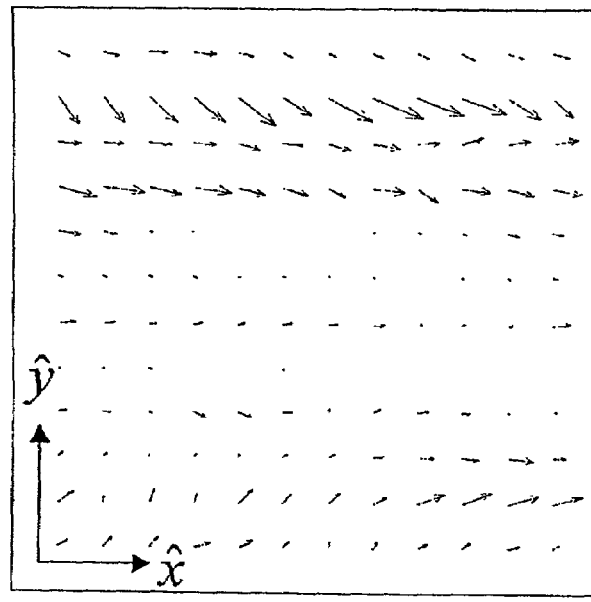
FIG. 10D shows the intensity-weighted velocity vector field of a speckle pattern produced by a numerical simulation of a tilting motion of a diffusely reflecting surface about the y-axis.

Lastly, the speckle motion resulting from tilting the scattering surface about an axis parallel to the detector was simulated. This motion leads to the vector flow field illustrated in FIG. 10D and is seen to have a similar appearance to the vector flow field resulting from translations of the scattering surface illustrated in FIG. 10A. The flow field illustrated in FIG. 10D corresponds to a small angular shift. It is observed that tilt produces a rapidly changing speckle shift.

Figure 11:
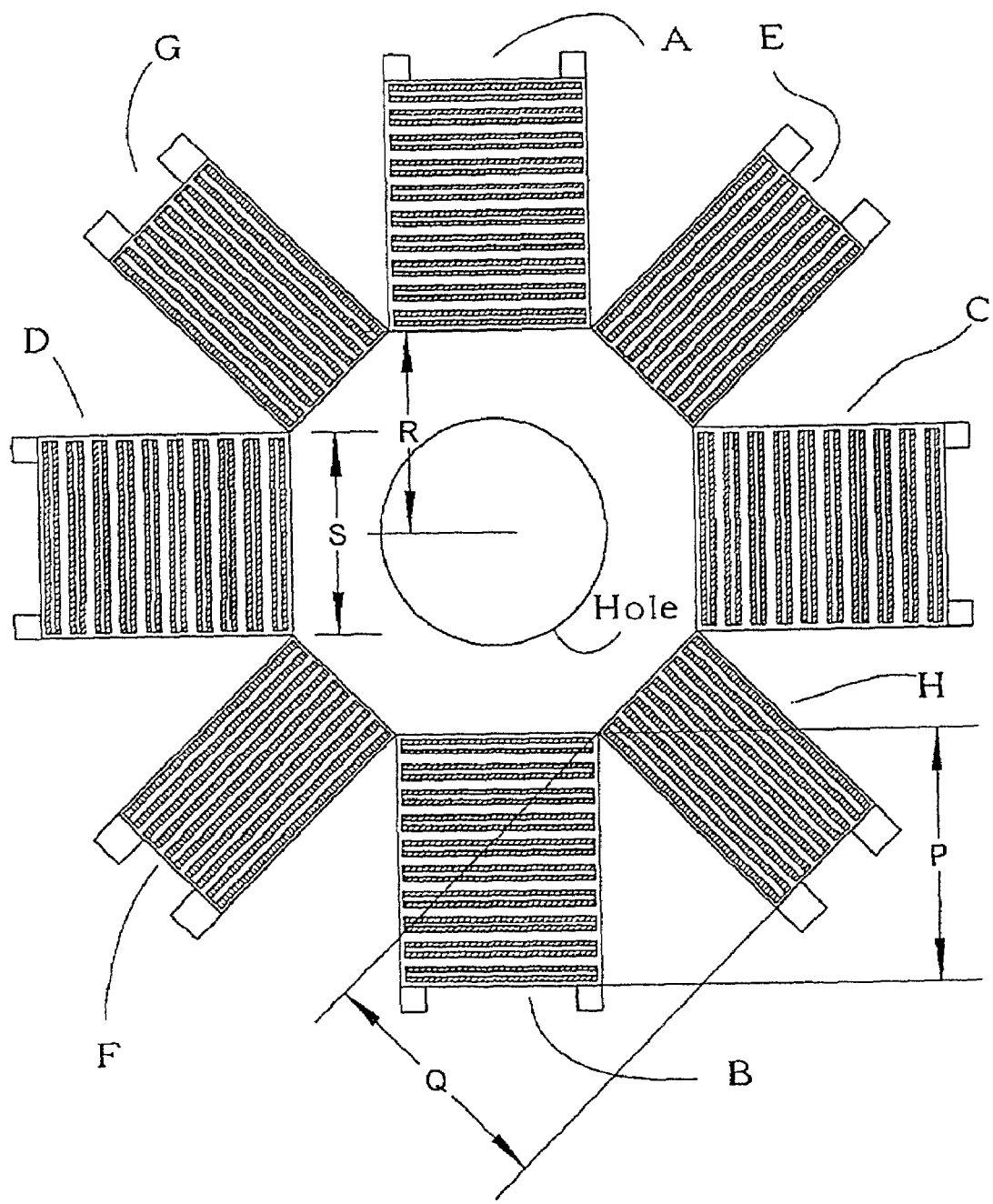
FIG. 11 shows a schematic diagram of a preferred embodiment of the electrode groups and orientations according to the invention.

In order to illustrate the extraction of signals from these basic speckle pattern movements the preferred pattern velocity detector array is diagrammatically illustrated in FIG. 11 to define the axes and variable dimension names used to describe the pattern. The pattern consists of eight inter-digitized velocity detectors. Each detector is connected to an independent output channel. Detectors labeled A, B, C, and D will be referred to as the radial detectors and detectors labeled E, F, G, and H will be referred to as the rotational detectors.

Each radial detector comprises M straight electrode pairs spaced along a radial direction with a distance R separating the center of the detector array and the electrodes nearest the center of the detector array. Each electrode of the radial detectors is normal to and centered on an imaginary line starting at the center of the detector array. For the radial detector A, the imaginary line is directed in the $\hat{Y}$-direction. For the detector B, the imaginary line is directed in the minus $\hat{Y}$-direction. For the detector C, the imaginary line is directed in the $\hat{X}$-direction. For the detector D, the imaginary line is directed in the minus $\hat{X}$-direction. Each exposed electrode segment of the radial detectors has length S. For each radial detector, the distance between the electrode nearest the center of the detector array and the electrode furthest from the detector array is given by P. Each of the electrode pairs in each of the rotational detectors has length Q. Each rotational detector is comprised of N electrode pairs. A line segment connecting detector A and detector C with minimal distance borders the rotational detector E on the side closest to the center of the detector. The electrode pairs of the rotational detector E are directed normal to this line segment.

A line segment connecting detector C and detector B with minimal distance borders the rotational detector H on the side of the detector closest to the center of the detector array. The electrode pairs in the rotational detector H are directed normal to this line segment. A line segment connecting detector B and detector D with minimal distance borders the rotational detector F on the side of the detector closest to the center of the detector array. The electrode pairs in the rotational detector F are directed normal to this line segment. A line segment connecting detector D and detector A with minimal distance borders the rotational detector G on the side of detector closest to the center of the detector array. The electrode pairs in the rotational detector G are directed normal to this line segment.

The signal generated by each electrode pair is proportional to the component of the vector flow field that is normal to the electrode pair, integrated over the length of the electrode pair. The signal for each channel is estimated by the sum of the signals from each electrode pair that is connected to the channel. It follows from the definitions above that for a given flow vector field $\Phi(x, y)$, the channel signals can be approximated over the active regions by the following equations:

$$A = \eta_A \sum_{j=0}^{M-1} \int_{-S/2}^{S/2} \hat{y} \cdot \Phi\left(l, R + j\left(\frac{P}{M-1}\right)\right) dl,$$

$$B = -\eta_B \sum_{j=0}^{M-1} \int_{-S/2}^{S/2} \hat{y} \cdot \Phi\left(l, -R - j\left(\frac{P}{M-1}\right)\right) dl,$$

$$C = \eta_C \sum_{j=0}^{M-1} \int_{-S/2}^{S/2} \hat{x} \cdot \Phi\left(R + j\left(\frac{P}{M-1}\right), l\right) dl,$$

$$D = -\eta_D \sum_{j=0}^{M-1} \int_{-S/2}^{S/2} \hat{x} \cdot \Phi\left(-R - j\left(\frac{P}{M-1}\right), l\right) dl,$$

$$E = \eta_E \sum_{j=0}^{N-1} \int_0^{Q_1} \left(\frac{\hat{y} - \hat{x}}{\sqrt{2}}\right) \cdot$$

$$\Phi\left(R - j\left(\frac{R - S/2}{N-1}\right) + \frac{l}{\sqrt{2}}, \frac{S}{2} + j\left(\frac{R - S/2}{N-1}\right) + \frac{l}{\sqrt{2}}\right) dl,$$

$$F = \eta_F \sum_{j=0}^{N-1} \int_0^{Q_1} \left(\frac{\hat{x} - \hat{y}}{\sqrt{2}}\right) \cdot \Phi\left(-R + j\left(\frac{R - S/2}{N-1}\right) - \frac{l}{\sqrt{2}},\right.$$

-continued $$-\frac{S}{2} - j\left(\frac{R-S/2}{N-1}\right) - \frac{l}{\sqrt{2}}\right) dl,$$

$$G = \eta_G \sum_{j=0}^{N-1} \int_0^Q \left(\frac{-\hat{y}-\hat{x}}{\sqrt{2}}\right) \cdot \Phi\left(-R + j\left(\frac{R-S/2}{N-1}\right) - \frac{l}{\sqrt{2}},\right.$$

$$\left.\frac{S}{2} + j\left(\frac{R-S/2}{N-1}\right) + \frac{l}{\sqrt{2}}\right) dl,$$

$$H = \eta_H \sum_{j=0}^{N-1} \int_0^{Q_1} \left(\frac{\hat{y}+\hat{x}}{\sqrt{2}}\right) \cdot \Phi\left(R - j\left(\frac{R-S/2}{N-1}\right) + \frac{l}{\sqrt{2}},\right.$$

$$\left.-\frac{S}{2} - j\left(\frac{R-S/2}{N-1}\right) - \frac{l}{\sqrt{2}}\right) dl,$$

where proportionality constants are given respectively by $\eta_A$, $\eta_B$, $\eta_C$, $\eta_D$, $\eta_E$, $\theta_F$, $\eta_G$, and $\eta_H$.

The signals for each channel were computed for each of four vector flow fields: the flow field $\Phi_x$ represents a uniform flow in the $\hat{Y}$-direction; the flow field $\Phi_{rot}$ represents a counter clockwise axial flow about the center of the detector; and $\Phi_{radial}$ represents a radial flow outward from the center of the detector.

TABLE 1

|   | $\Phi_x = \hat{x}$ | $\Phi_y = \hat{y}$ | $\Phi_{rot} = -y\hat{x} + x\hat{y}$ | $\Phi_{rad} = x\hat{x} + y\hat{y}$ |
|---|---|---|---|---|
| A | 0 | MS | 0 | $MS\left(R + \frac{P}{2}\right)$ |
| B | 0 | $-MS$ | 0 | $MS\left(R + \frac{P}{2}\right)$ |
| C | MS | 0 | 0 | $MS\left(R + \frac{P}{2}\right)$ |
| D | $-MS$ | 0 | 0 | $MS\left(R + \frac{P}{2}\right)$ |
| E | $-NQ/\sqrt{2}$ | $NQ/\sqrt{2}$ | $N\left(\frac{S}{2} + R + \frac{Q}{\sqrt{2}}\right)\frac{Q}{\sqrt{2}}$ | 0 |
| F | $NQ/\sqrt{2}$ | $-NQ/\sqrt{2}$ | $N\left(\frac{S}{2} + R + \frac{Q}{\sqrt{2}}\right)\frac{Q}{\sqrt{2}}$ | 0 |
| G | $-NQ/\sqrt{2}$ | $-NQ/\sqrt{2}$ | $N\left(\frac{S}{2} + R + \frac{Q}{\sqrt{2}}\right)\frac{Q}{\sqrt{2}}$ | 0 |
| H | $NQ/\sqrt{2}$ | $NQ/\sqrt{2}$ | $N\left(\frac{S}{2} + R + \frac{Q}{\sqrt{2}}\right)\frac{Q}{\sqrt{2}}$ | 0 |

Each of the four speckle pattern movements represented in the vector flow fields of Table 1 can be extracted from signals provided by the eight channels in the following manner, $$V_x = W_1(C-D) + W_2(-E+F-G+H)$$

$$V_y = W_3(A-B) + W_4(E-F-G+H)$$

$$V_{axial} = W_5(E+F+G+H)$$

$$V_{radial} = W_6(A+B+C+D),$$

where $W_1$, $W_2$, $W_3$, $W_4$, $W_5$, and $W_6$ are weighting coefficients.

The terms and expressions which have been employed in the foregoing specification are used therein as terms of description and not of limitation, and there is no intention, in the use of such terms and expressions, of excluding equivalent of the features shown and described or portions thereof, it being recognized that the scope of the invention is defined and limited only by the claims which follow.

The invention claimed is:

1. A device for producing a signal for controlling an apparatus by moving a reflecting surface relative to the device, comprising:
    a light source for illuminating the moving reflecting surface;
    a sensor for receiving from the moving reflecting surface a corresponding moving pattern of light and producing a sensor electrical signal related to the movement of said pattern, said sensor comprising a photo-emf material having a plurality of electrodes disposed thereon for detecting electrical current caused by differential emf generated by the motion of said pattern received by said sensor; and
    an interface circuit for producing from said sensor electrical signal said control signal to control the apparatus.

2. The device of claim 1, wherein said plurality of electrodes comprises a first set of electrodes arranged so as to define a first direction normal thereto, and a second set of electrodes arranged so as to define a second direction normal thereto, said first direction and said second direction being askew to one another.

3. The device of claim 2, wherein said plurality of electrodes comprises a plurality of interdigitated electrode pairs having gaps between adjacent electrodes, the material between every other said gap being having a reduced photo-emf property.

4. The device of claim 2, wherein said plurality of electrodes comprises a plurality of interdigitated electrode pairs having gaps between adjacent electrodes, said sensor further comprising a mask disposed over said plurality of electrodes so as to block light from illuminating alternate said gaps.

5. The device of claim 1, wherein said plurality of electrodes comprises a plurality of groups of electrodes arranged in different respective spatial orientations.

6. The device of claim 5, wherein said groups of electrodes comprise pluralities of interdigitated electrode pairs having gaps between adjacent electrodes, alternate gaps producing no photo-emf effect.

7. The device of claim 5, wherein said groups of electrodes are arranged in a rotationally-symmetric pattern, and the optical axis of said light source is coincident with the axis of rotational symmetry of said pattern.

8. The device of claim 5, wherein each said group of electrodes defines a maximum emf-sensitivity-vector, said sensitivity vectors forming a cross.

9. The device of claim 5, wherein each said group of electrodes defines a maximum emf-sensitivity-vector, said sensitivity vectors forming a loop.

10. The device of claim 5, wherein each said group of electrodes defines a maximum emf-sensitivity-vector, said sensitivity vectors forming a plurality of radial spokes.

11. The device of claim 5, wherein each said group of electrodes defines a maximum emf-sensitivity-vector, said sensitivity vectors forming a plurality of radial spokes and concentric arcs.

12. The device of claim 5, wherein said electrodes form concentric arcs.

13. The device of claim 5, wherein said electrodes form a substantially planar spiral.

14. The device of claim 1, wherein said photo-emf material comprises doped gallium arsenide.

15. The device of claim 14, wherein said electrodes comprise gold:germanium alloy.

16. The device of claim 1, wherein said light source comprises a coherent light source.

17. The device of claim 16, wherein said coherent light source comprises a laser.

18. The device of claim 16, wherein said coherent light source produces linearly polarized light.

19. The device of claim 18, wherein light reflected from said reflecting surface to said sensor is filtered to irradiate said sensor only with linearly polarized light.

20. The device of claim 17, wherein said device further comprises a laser controller for controlling the power to said laser based on the light detected by said sensor.

21. The device of claim 1, further comprising optics for directing light from said light source to the reflecting surface, thereby producing an irradiating pattern of desired size and shape on the reflecting surface.

22. The device of claim 1, further comprising optics for directing light from the reflecting surface to said sensor.

23. The device of claim 1, wherein said interface circuit comprises electrical signal-conditioning circuitry for amplifying, filtering, and scaling said sensor signal, as needed.

24. The device of claim 23, wherein said interface circuit further comprises a conversion circuit for receiving said sensor signal following any needed amplification, filtering and scaling, and producing said control signal in a format acceptable by the apparatus to be controlled.

25. The device of claim 1, wherein said interface circuit comprises means for decomposing said sensor signal into signals representative of translation of the reflecting surface and rotation of the reflecting surface, respectively.

26. The device of claim 1, wherein said interface circuit comprises means for decomposing said sensor signal into command signals related to predetermined motions of the reflecting surface.

27. The device of claim 1, wherein said interface circuit comprises means for detecting a signal condition for activating or deactivating continuance of a control signal representative of a current motion.

28. The device of claim 1, wherein the apparatus to be controlled is a digital computer.

29. The device of claim 1, wherein the apparatus to be controlled is a display device for representing a three-dimensional image, wherein sensor signals resulting from translation of the reflecting surface produce translation of an image produced by said display device, and sensor signals resulting from rotation of said reflecting surface produce rotation of said image produced by said display device.

30. The device of claim 1, wherein the apparatus to be controlled is a robotic device wherein sensor signals resulting from translation and rotation of said reflecting surface produce corresponding motion of said robotic device.

31. The device of claim 1, wherein said device to be controlled is a virtual reality device wherein sensor signals resulting from motion of said reflecting surface produce predetermined responses in virtual space.

32. A device for producing a signal for controlling an apparatus by moving the device over a diffusely reflecting surface, comprising:
 a case;
 a support member for movably supporting said case on the surface;
 a coherent light source disposed within said case for illuminating the surface; and
 a sensor disposed within said case for receiving from said surface, by moving said case thereover, a corresponding moving speckle pattern of light and producing a sensor electrical signal related to said movement of said pattern for controlling the apparatus, said sensor comprising a photo-emf material having a plurality of electrodes disposed thereon for detecting electrical current caused by differential emf generated by the motion of said pattern received by said sensors so as to produce said electrical signal.

33. The device of claim 32, further comprising an interface circuit for producing from said sensor electrical signal a control signal for controlling the apparatus.

34. A device for producing a signal for controlling an apparatus, comprising:
 a case for movably supporting a ball for rotation;
 a coherent light source for illuminating a surface of said ball;
 a sensor for receiving from said surface, by rotating said ball, a corresponding moving speckle pattern of light that has been caused to move by rotation of said ball and producing a sensor electrical signal related to said movement of said pattern for controlling the apparatus, said sensor comprising a photo-emf material having a plurality of electrodes disposed thereon for detecting electrical current caused by differential emf generated by the motion of said pattern received by said sensors so as to produce said electrical signal.

35. The device of claim 34, further comprising an interface circuit for producing from said sensor electrical signal a control signal for controlling the apparatus.

36. A human-machine interface method for controlling an apparatus by moving a hand, comprising:
 moving the hand while illuminating the surface of the hand;

receiving from the surface of the hand a corresponding changing distribution of irradiance; and producing a sensor electrical signal related to said changing distribution of irradiance for controlling an apparatus by detecting a differential emf in a material illuminated by said changing distribution of irradiance.

37. The method of claim 36, further comprising providing coherent light for said step of illuminating, so that said changing distribution of irradiance is a moving speckle pattern.

38. The method of claim 37, wherein said coherent light is linearly polarized.

39. The method of claim 38 wherein light from said reflecting surface is filtered to receive only linearly polarized light.

40. The method of claim 36, further comprising producing from said sensor electrical signal a control signal for controlling the apparatus.

* * * * *